(12) United States Patent
Baudron et al.

(10) Patent No.: US 7,329,830 B2
(45) Date of Patent: Feb. 12, 2008

(54) HIGH-RATE LASER MARKING MACHINE

(75) Inventors: Patrick Baudron, Boigny sur Bionne (FR); Frederic Beulet, Meung sur Loire (FR); Benoit Berthe, Orleans (FR); Dominique Perdoux, Mardie (FR)

(73) Assignee: Datacard Corp., Hopkins, MN (US)

( * ) Notice: Subject to any disclaimer, the term of this patent is extended or adjusted under 35 U.S.C. 154(b) by 171 days.

(21) Appl. No.: 11/136,719

(22) Filed: May 25, 2005

(65) Prior Publication Data

US 2006/0213879 A1 Sep. 28, 2006

(30) Foreign Application Priority Data

Mar. 23, 2005 (FR) .................................. 05 02904

(51) Int. Cl.
*B23K 26/00* (2006.01)
(52) U.S. Cl. .............................. 219/121.68; 219/121.82
(58) Field of Classification Search ........... 219/121.68, 219/121.69, 121.82
See application file for complete search history.

(56) References Cited

U.S. PATENT DOCUMENTS

| | | | | |
|---|---|---|---|---|
| 4,024,545 A | * | 5/1977 | Dowling et al. | ....... 219/121.68 |
| 4,564,739 A | * | 1/1986 | Mattelin | ................. 219/121.68 |
| 5,504,345 A | * | 4/1996 | Bartunek et al. | ......... 250/559.4 |
| 5,521,628 A | * | 5/1996 | Montgomery | ............... 347/243 |
| 5,714,743 A | * | 2/1998 | Chiba et al. | ................. 235/449 |
| 5,719,372 A | * | 2/1998 | Togari et al. | ........... 219/121.68 |
| 5,986,235 A | * | 11/1999 | Canella | .................. 219/121.68 |
| 6,262,388 B1 | * | 7/2001 | Canella et al. | ......... 219/121.68 |
| 6,359,253 B1 | * | 3/2002 | Sritulanont et al. | ..... 219/121.68 |
| 6,417,484 B1 | * | 7/2002 | Canella et al. | ......... 219/121.68 |
| 6,710,364 B2 | * | 3/2004 | Guldi et al. | ........... 250/559.44 |
| 6,734,392 B2 | * | 5/2004 | Philipp et al. | ......... 219/121.68 |

FOREIGN PATENT DOCUMENTS

| | | | |
|---|---|---|---|
| EP | 776725 A1 | * | 6/1997 |
| JP | 1-306082 A | * | 12/1989 |
| JP | 3-276652 A | * | 12/1991 |
| JP | 4-127982 A | * | 4/1992 |
| JP | 7-299573 A | * | 11/1995 |

* cited by examiner

*Primary Examiner*—Geoffrey S. Evans
(74) *Attorney, Agent, or Firm*—Lowe Hauptman Ham & Berner LLP

(57) ABSTRACT

A laser marking machine for objects, namely supports or cards carrying integrated circuits, has a laser chamber having two marking locations for receiving the objects to be marked on at least one face by at least one laser marker having optics for deflecting the laser beam onto one of the marking locations. A transfer device has a transfer path for transporting the objects to be marked or already marked, respectively, to or out of the laser chamber.

24 Claims, 12 Drawing Sheets

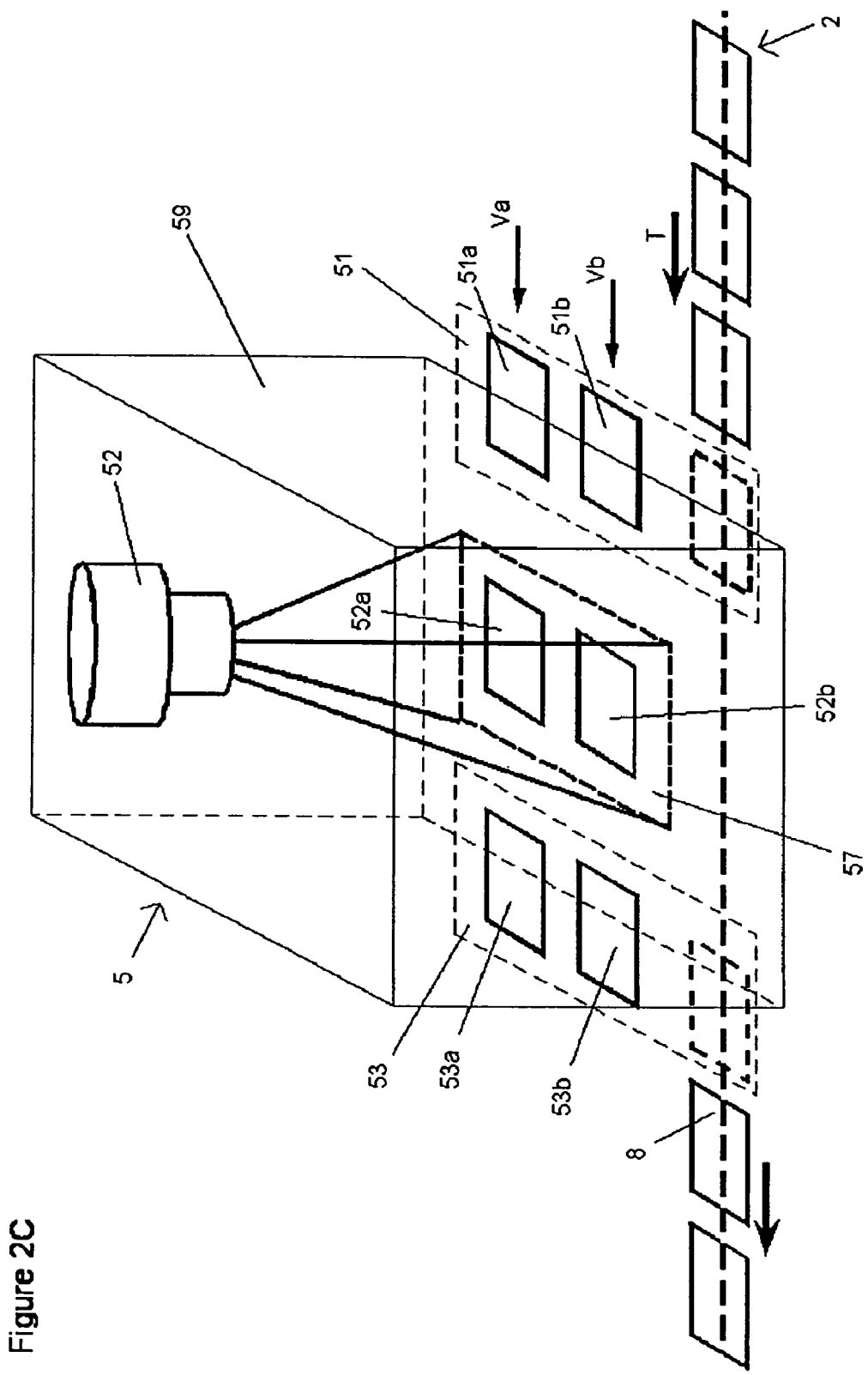

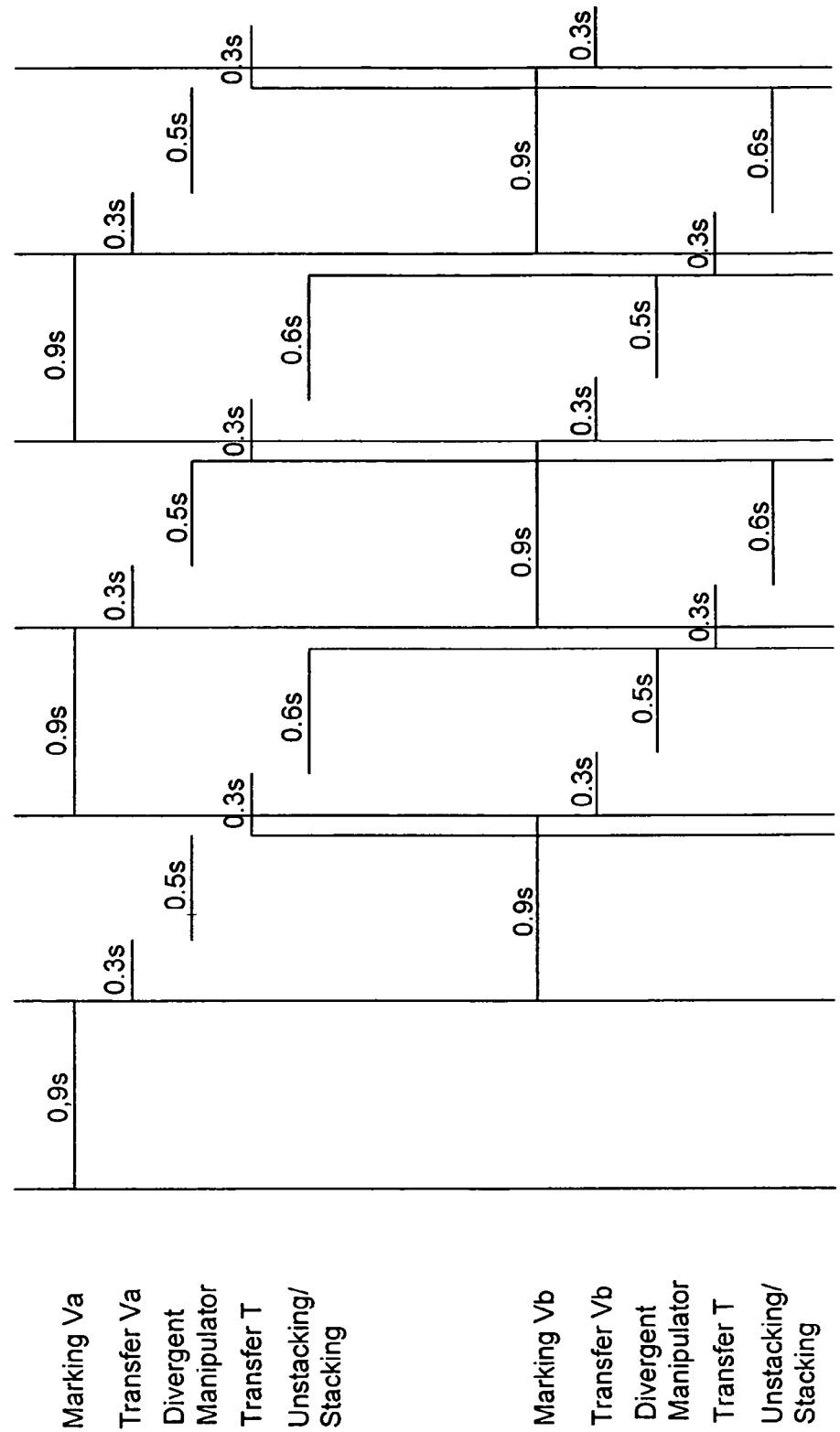

HIGH-RATE LASER MARKING MACHINE

RELATED APPLICATION

The present application is based on, and claims priority from, French Application No. 05 02904, filed Mar. 23, 2005, the entire disclosure of which is hereby incorporated herein by reference.

FIELD OF THE INVENTION

The present invention relates in general to a high-rate laser marking machine and, more particularly, to a sequential laser marking machine for plastic cards incorporated in a smart card personalisation machine.

BACKGROUND OF THE INVENTION

Laser marking machines known in the prior art allow printing patterns on the support of plastic cards. These machines generally comprise a marking element which can be a laser transmitter, a marking location for lodging a card to be marked opposite the marking element, and a transfer path to supply the card to be marked to the marking location or remove cards already marked from the marking location. A marking machine of this type thus needs to stop the laser beam after marking a first card and to await the arrival of a second card to be marked to activate the laser beam. The machine, such as illustrated here, thus needs several sequences of steps to complete marking of a single smart card. The inertia of the transfer device and the temporisations to be applied for each sequence are penalising, since they generate time losses.

SUMMARY OF THE INVENTION

The aim of the present invention is to eliminate certain disadvantages of the prior art by proposing a laser marking machine for the support of plastic cards with or without a chip.

This aim is attained by a laser marking machine for supports, optionally cards, optionally comprising integrated circuits, characterised in that the laser marking machine comprises:
  at least one laser chamber comprising at least two marking locations for receiving supports to be marked on at least one face by at least one laser marking means comprising optical means allowing the laser beam to be deflected onto one of the marking locations,
  at least one transfer device comprising a transfer path transporting the supports to be marked or already marked, respectively to or out of the laser chamber.

In accordance with another particular feature, the laser marking machine is linked to an information system comprising a database storing marking data to be transferred to the laser marking machine and generating orientation data in the optical means directed to the one of the locations.

In accordance with another particular feature, the laser marking machine comprises a single laser chamber comprising a plurality of laser marking means directed to a plurality of pairs of marking locations for marking supports on at least one face, the optical means of each of the laser marking means enabling their laser beam to be deflected alternatively onto one of the two marking locations of each of the pairs of marking locations.

In accordance with another particular feature, the laser marking means are fixed and in that its optical means comprise a production element of a laser beam as a function of the marking data stored in the database of the information system, a deflection element of the laser beam receiving the laser beam produced to direct it to one of the two marking locations and to direct it during laser marking as a function of the orientation data received about the supports and a refining element of the laser beam.

In accordance with another particular feature, deflection element of the laser beam comprises an inlet opening, an outlet opening and two mirrors whereof the inclination of each is controlled by a galvanometric device, the mirrors being arranged opposite one another, such that the laser beam, produced by the production element of a laser beam as a function of the marking data and passing through the inlet opening of the deflection element, projects onto a first mirror which reflects the laser beam and projects it onto a second mirror also reflecting the laser beam to direct it to the outlet opening of the deflection element and orient it to a marking location, the inclination of each of the two mirrors being activated by a drive mechanism controlled by the orientation data of the information system, one of the two mirrors inclining according to a vertical axis of rotation to have the laser beam deflect horizontally, and the other mirror inclining according to its horizontal axis of rotation to have the laser beam deflect vertically.

In accordance with another particular feature, the laser marking means comprise a refining element of the laser beam, such as a converging lens, arranged between the deflection element of the laser beam and the marking locations.

In accordance with another particular feature, the two marking locations are situated on the same side of the transfer device, such as to reduce the size of the field to be scanned by the laser beam to cover the two marking locations and, consequently, improve the precision of the laser beam.

In accordance with another particular feature, the laser marking machine comprises:
  at least one loading device arranged in the vicinity of the transfer device and the laser chamber to load the supports from the transfer device to be marked to one of the two marking locations;
  at least one unloading device arranged in the vicinity of the transfer device and the laser chamber to unload the previously marked supports from one of the two marking locations to the transfer device.

In accordance with another particular feature, the laser chamber comprises two distinct intra-chamber transfer paths, each activated by a respective drive mechanism and arranged parallel relative to one another, each intra-chamber transfer path comprising three locations including an inlet location, a marking location and an outlet location, the supports to be marked being housed horizontally in the locations, the two inlet locations being arranged in the vicinity of the loading device comprising at least a divergence manipulator for loading the supports to be marked coming from the single-path transfer device on one of the two inlet locations of the intra-chamber paths, the two outlet locations being arranged in the vicinity of the unloading device comprising at least one convergence manipulator enabling the marked supports to be unloaded from one of the two outlet locations on the transfer device having one transfer path, the laser marking means being arranged facing the two marking locations and the axis of symmetry of the laser beam produced by the laser marking means being arranged in a plane perpendicular to the marking locations, the laser beam being capable of scanning the marking locations and scanning a marking location of one transfer path at the same time, and in that the drive mechanisms of the two intra-chamber transfer paths, the convergence and divergence manipulators of the loading devices and, respectively, unloading devices and the mirrors of the deflection element are controlled alternately by the information system, enabling a support housed on the marking location of a first intra-chamber transfer path to be marked, while the other intra-chamber transfer path supplies another support to be marked on its marking location.

In accordance with another particular feature, the information system comprises means for determining the identity and the face to be marked of the support supplied by one of the intra-chamber transfer paths on the marking location associated with the intra-chamber path, means for determining the marking location which is to receive the support to be marked, decision and recovery means, as a function of these determinations, of the marking data stored in the database for transferring the marking data to means for generating orientation data controlling the drive mechanisms of the mirrors deflecting the laser beam either during marking of the face of a support or during the shifting of the laser beam from one marking location to another marking location.

In accordance with another particular feature, the information system comprises means for determining the laser marking on one of the two intra-chamber transfer paths, decision means, as a function of this determination, controlling the advancement by one step of the intra-chamber transfer path not exposed to the laser beam, means for determining the completion of advancement of the intra-chamber transfer path and decision means controlling the drive mechanisms of the convergence manipulator and the divergence manipulator.

In accordance with another particular feature, each transfer path of the laser chamber comprises a return element arranged facing the marking location and comprising a rotary clip enabling, because of an axis of rotation aligned in the plane of the transfer paths, a marked support on one of these faces to be returned and to be repositioned on the same marking location, so as to mark the other face by the marking means according to the direction opposite the first face, the rotation of the clip of a turning element being activated by a drive mechanism, the drive mechanism of the two transfer paths of the laser chamber, the mirrors of the deflection element and these return elements being controlled alternately by the information system.

In accordance with another particular feature, the information system comprises means for determining the completion of the laser marking of a first face of a support, means for determining the existence of marking data in the database intended to be engraved on the second face of the support and decision means, as a function of these determinations, controlling or not controlling the drive mechanism of the return element associated with the marking location housing the support during the laser marking of another support housed on the second marking location.

In accordance with another particular feature, the laser marking machine comprises a marking support arranged according to a vertical plane and comprising an upper part and a lower part, each part comprising at least a marking location enabling vertical housing of supports to be marked, each marking location being provided selectively by at least one manipulator arm, incorporated into a loading/unloading device, from a transfer path passing via a plane perpendicular to the marking support, the laser marking means having an axis of symmetry projected perpendicularly relative to the supports to be marked housed in the marking locations and the laser beam capable of scanning one of each of the marking locations at the same time.

In accordance with another particular feature, each manipulator arm is incorporated into the loading/unloading device arranged in the vicinity of the marking support and the transfer path, each manipulator arm comprising actioning means to direct it to one of the marking locations or to the transfer path, a gripping clip arranged at the end of the manipulator arm comprising a drive mechanism enabling a card of the transfer path to be gripped and the card to be held during the laser marking of one of its faces, the drive mechanism of the clip and the actioning means of each manipulator arm being controlled by the information system alternately.

In accordance with another particular feature, each marking location situated on the upper part of the marking support allows marking of one face of a support, and each marking location situated on the lower part of the marking support allows marking of the other face.

In accordance with another particular feature, the information system comprises means for determining the identity and the face to be marked of the support supplied by the transfer path in the vicinity of the loading/unloading device, means for determining the marking location which is to receive the support to be marked, decision and recovery means, as a function of these determinations, of the marking data stored in the database to transfer them to means for generating orientation data controlling the drive mechanisms of the mirrors deflecting the laser beam either during marking of one face of a support, or during the shifting of the laser beam from one marking location to another marking location.

In accordance with another particular feature, the information system comprises means for determining the laser marking on one of the marking locations, decision means, as a function of this determination, controlling the actioning means of the manipulator arm and the drive mechanism of the clip of the same manipulator arm for loading the support previously marked on the transfer path, means for determining the unloading of the support, decision means, as a function of this determination, for controlling the advancement of the transfer path by a step and decision means for activating the actioning means of the manipulator arm and the drive mechanism of the clip for loading a fresh support to be marked on the marking support.

In accordance with another particular feature, the laser marking machine comprises two cylindrical barrels each having four gripping positions placing the supports to be marked in planes passing through y the axis of rotation of the barrels and oriented perpendicularly to one another, the barrels comprising gripping means of the supports to be marked, each of the gripping positions being supplied successively in two recto and verso marking positions arranged in a vertical marking plane, the marking means having their axis of symmetry perpendicular to the marking plane, the transfer path parallel to the axis of rotation of the barrels ensuring the provision and removal of each of the gripping positions, the barrels being each connected to a drive mechanism controlled by the information system.

In accordance with another particular feature, the information system comprises means for determining the identity and the face to be marked of the support supplied by the transfer path in the vicinity of the barrel, means for determining and detecting of the gripping position which is to receive the support to be marked, decision and recovery means, as a function of these determinations, of the marking data stored in the database to transfer them to means for generating orientation data controlling the drive mechanisms of the mirrors deflecting the laser beam either during the marking of one face of a support, or during the shifting of the laser beam from one marking location to another marking location.

In accordance with another particular feature, the information system comprises means for determining the laser marking directed to one of the marking locations of a first barrel, decision means, as a function of this determination, controlling the drive mechanism of the second barrel not exposed to the laser beam for supplying a gripping position in the vicinity of the transfer path, means for detecting the stopping of rotation of the second barrel, decision means controlling the gripping means of the gripping positions of the two barrels, arranged in the vicinity of the transfer path for unloading a previously marked support, detection means, means for determining unloading of the support, decision means as a function of this determination for controlling the advancement of the transfer path by two steps and decision means for activating the gripping means of the gripping positions arranged in the vicinity of the transfer path enabling fresh supports to be marked to be loaded on the barrels.

In accordance with another particular feature, the laser marking machine comprises an unstacking device for supports to be distributed on the transfer path and a stacking device for supports to be removed from the transfer path to be stored in a magazine.

In accordance with another particular feature, the laser marking machine comprises a personalising device of the integrated circuit of a smart card linked to the information system comprising personalisation data in its database capable of corresponding with the marking data of the support of the smart card, the information system comprising follow-up means of the personalisation and the marking of the smart cards.

BRIEF DESCRIPTION OF THE DRAWING

Other particular features and advantages of the present invention will emerge more clearly from reading the following description, made in reference to the attached diagrams, in which:

FIG. 2C is an illustrative perspective view of a marking machine for enabling the precision of the laser to be increased by reducing the marking field according to an embodiment of the present invention;

FIG. 6 is a time flow diagram of the operation of a marking machine in accordance with an embodiment of the present invention, such as that of FIG. 2A;

DETAILED DESCRIPTION OF THE INVENTION

The invention relates to the field of personalisation of supports, preferably plasticized, owing to laser marking. Even though the following description refers, by way of example, to the marking of smart cards, the supports which can be personalised because of the present invention can consist of other plasticized supports such as cards with or without a chip. In referring to FIG. 1B, a smart card (8) comprises a chip (80) or an integrated circuit inserted on a blank support (81). The integrated circuit comprises at least communication elements and a memory. One of the principal aims of the invention is the marking of data on the support by a high-rate laser marking device.

Figure 1A:
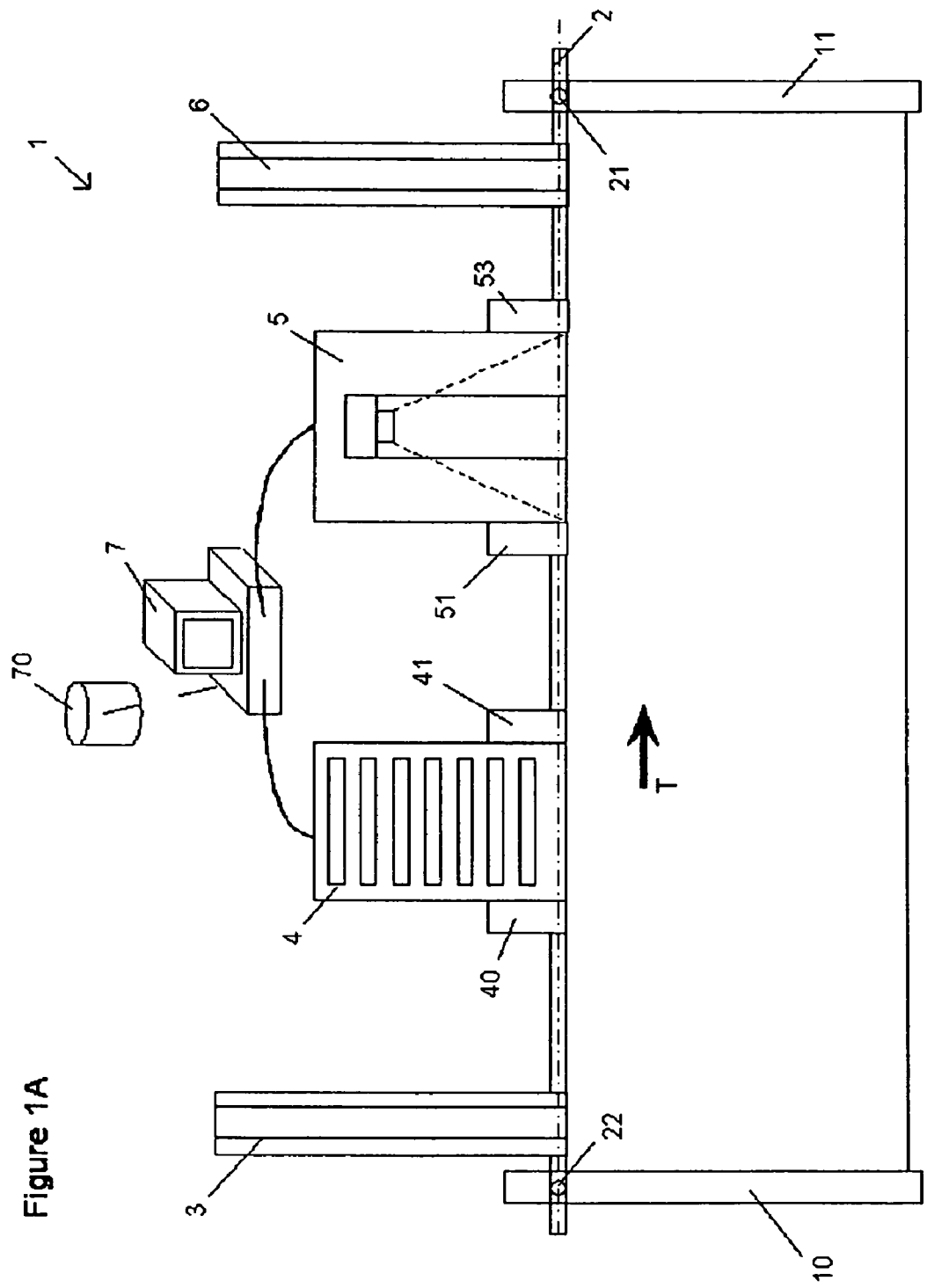
FIG. 1A is a frontal view of a personalisation machine in accordance with an embodiment of the present invention.
Figure 1C:
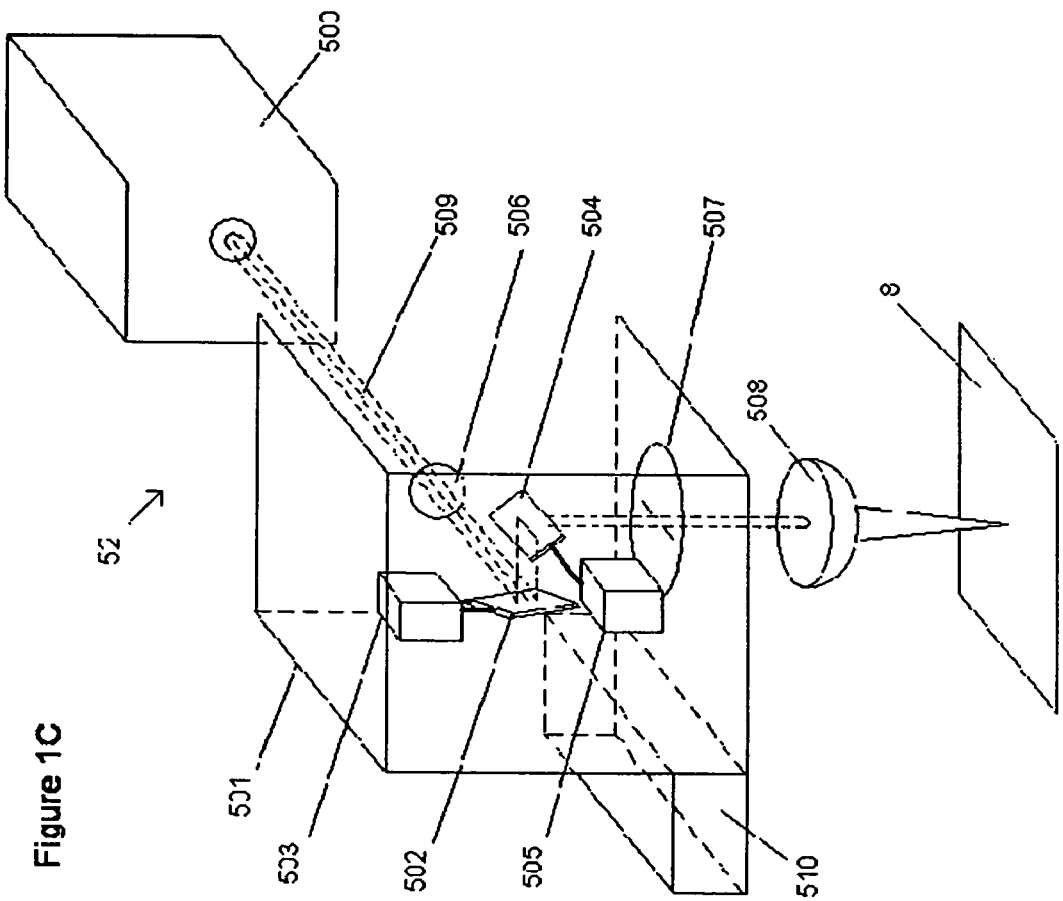
FIG. 1C is an illustration of a laser of a marking machine in accordance with an embodiment of the present invention.
Figure 1B:
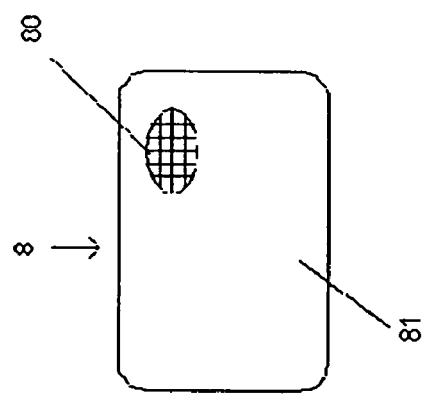
FIG. 1B is a frontal recto view of a smart card according to an embodiment of the present invention.

In reference to FIG. 1A, the personalisation machine is made up of a table (1) mounted on feet (10, 11) on the top of which is arranged a transfer path (2) formed by a continuous indexed belt circulating between two end pulleys (20, 21) whereof at least one is driven by a motor. Mounted on this endless belt (2) at regular intervals, in pairs, are gripping means (22), such as clips (or clamping pieces or tappets), whereof the distance between two of the consecutive clips (22) correspond to the length of a smart card (8) when the cards to be transferred is in a horizontal position on the transfer path. Each pair of clips (22) distant by a length of a smart card (8) is adjacent to the following pair by a shorter length. The clips (22) allow the smart cards (8) to be kept during shifting on the out part of the path indicated by the arrow (T) in FIG. 1, and the drive of the smart cards (8) from one station to another. For more detail on the configuration of the clips (22) and the transfer device (2), reference can be made to European patent application 0 589 771 by the same applicant.

A variant embodiment of the transfer path (2) and the gripping means (22) can be envisaged to transfer the smart cards vertically. In reference to FIG. 1A, the table comprises an unstacking device (3) which distributes the cards (8) from a batch of stacked smart cards (8) and inserts them one by one between each pair of clips (22). The unstacking device (3) comprises a double inlet magazine allowing provisioning without the machine stopping, the exchange of magazines being carried out in masked time. Each magazine is removable with a capacity, for example, of 500 smart cards. The smart cards (8) thus introduced to the transfer path (2) are supplied to a personalisation station (4) for the smart cards (8), allowing the personalisation data to be memorised in the memory of the chip (80) of the smart cards (8). A loading device (40) introduces the cards to be personalised in the personalisation station (4) and an unloading device (41) unloads the personalised smart cards from the personalisation station (4). Once personalised, the smart cards (8) are supplied via the transfer path (T) to a marking station (5) for the marking of supports of the smart cards (8).

A loading device (51), situated in the vicinity of the transfer device helps introduce the smart cards (8) not marked in the marking machine (5) and an unloading device (53), situated in the vicinity of the marking machine and the transfer device, unloads the marked cards. The cards are then transported by the belt (2) to an ejection station (not shown). This ejection station then redirects the cards (8) whereof the personalisation or the marking was incomplete or defective to a trap. If the personalisation and the marking were successful, the cards are transferred to a conventional stacking device (6) where they are stacked in a double magazine, operating along the same principle as the unstacking device (3) but in the inverse direction. The position of the personalisation station (4) and the position of the marking machine (5) can be interchanged, the marking machine (5) able to be arranged in front of the personalisation station (4). An information system (7), such as a computer, is linked to the marking machine (5) and to the personalisation station (4). This information system (7) comprises a database (70) comprising personalisation data and marking data. During personalisation of a card (8), the information system (7) sends to the personalisation station (4) the personalisation data relative to the card to be personalised, the personalisation station (4) being responsible for transferring the personalisation data to the memory of the chip (80) of the card. During marking of the support (81) of a smart card, the information system (7) transmits the marking data to the marking machine (5), the marking machine (5) being responsible for inscribing the marking data onto the support (81) of the smart card (8).

The marking data and the personalisation data of a smart card (8) can be correlated. For example, the serial number of a smart card can be safeguarded in the memory of the chip (80) and can be inscribed on the support (81) of the chip. The information system (7) must therefore comprise follow-up means of the personalisation and the marking of each smart card (7). Finally, a control system, (not shown), which can be controlled by the information system, manages the sequential control of the personalisation machine and receives the information from different positioning devices, the different detection devices can, for example, be assured of the placing of a smart card transported by the belt (2) opposite the expedient station.

The principal object of the invention is to augment the rate of the marking of plastic cards with or without a chip (8). For example, to obtain a marking rate of 3600 cards/hour, it would be necessary to engrave a card in less than a second. The marking and transfer of the cards being serialised, the marking time lasts between 500 ms to 600 ms, the transfer time of cards from the transfer path (2) to the marking machine (5) or inversely lasts around 300 ms and the unstacking or stacking time of a card by, respectively, the unstacker (3) or the stacker (6) of the machine onto the transfer path (2) lasts around 600 ms. The machine loses much time in shifting cards between the marking machine (5) and the transfer path (2). The idea of the invention is to diminish and mask this card supply time (8), by shifting the cards to be marked on at least two marking locations and by undertaking continuous marking of cards.

FIGS. 2A to 4 all show a different illustration of a marking machine (5) of the support (81) of the smart cards (8). In reference to FIG. 2A, the marking machine (5) in general comprises at least one laser chamber (59) comprising at least two marking locations (52a, 52b) for housing cards to be marked, at least one laser marking means (52) housed in a device for protection from laser radiation, such as a chamber sealed off to radiation, the marking means having its axis of symmetry projected perpendicularly relative to the marking locations, a loading device (51) and an unloading device (53) for cards (8). In reference to FIG. 1C, the laser means (52) comprises optical means which are: a laser element (500) for producing a laser beam, a deflection element (501) of the laser beam to direct it alternatively to one of the two marking locations (52a, 52b) and a refining element (508) of the laser beam.

The deflection element (501) of the laser beam comprises two inclinable mirrors (502, 504) each held and actuated by an actioning mechanism (503, 505), the planes formed by each mirror (502, 504) being arranged perpendicularly to one another. A first mirror (502) is placed inclined opposite the inlet opening (506) of the deflection element and receives the laser beam (509) emitted by the laser element (500). The first mirror (502) is activated in rotation according to a vertical axis by a first action mechanism (503) horizontally deflecting the laser beam (509) projected, the first mirror (502) reflecting this laser beam (509) onto the second mirror (504). The second mirror (504) is placed inclined opposite the outlet opening (507) of the deflection element and receives the laser beam (509) reflected onto the first mirror (502). The second mirror (504) is placed in rotation according to a horizontal axis by the second action mechanism (505) effectively vertically deflecting the laser beam (509) reflected to the outlet opening (507) of the deflection element. The first and the second action mechanism (503, 505) are arranged in the deflection element and each comprises a control motor. On exiting from the deflection element the output laser beam will be refined by the refining element (508) which can be a converging lens and will then be projected onto one of the two marking locations (52a, 52b) following the inclination of the two mirrors.

In one embodiment, the action mechanisms (503, 505) of the vertical or horizontal inclination of the two mirrors (502, 504) are controlled by a galvanometric device controlled by the information system (7) of the personalisation machine. For each smart card to be engraved, the information system (7) recovers in its database (70) the data to be engraved on the smart card and generates orientation data which will be sent to the galvanometric device controlling the rotation mechanisms (503, 505) of the mirrors (502, 504) deflecting the laser beam (509). The deflection element (501) deflects the laser beam (509) during marking of the data on the support of a smart card (8) present on one of the two marking locations (52a, 52b) and during shifting of the laser beam (509) to one or the other of the two marking locations (52a, 52b). During shifting of the laser beam to one of the two marking locations (52a, 52b) the information system (7) controls the stopping of the emission of the laser. The object of the invention is to carry out continuous marking of the data on the supports of the cards (8). The deflection element (501) of the laser beam (509) and the refining element (508) of the laser beam (509) enlarge the laser marking field which can thus cover, for example, a field of 180 mm by 180 mm comprising four marking locations (FIG. 3: 52a', 52b', 54a', 54b' or FIG. 4: 52a", 52b", 54a", 54b").

A general marking cycle of the recto of the support of a smart card according an embodiment the present invention, is presented as follows. A first card is placed on a first marking location (52a) and the laser is drawn to this location (52a) to mark the card. During this time a second card is positioned on the second marking location (52b). At the end of the marking of the first card, the deflection element (501) of the laser directs the laser beam (509) to the second marking location (52*b*) where the second card to be marked is placed. During marking of the second card, the first marked card is removed from the marking machine (5) and is simultaneously replaced by a third card to be marked. Therefore the supply time of the cards to the marking locations is masked, the control of the tasks of marking and supplying the cards being carried out simultaneously. Consideration in general is now given to the duration of marking of 0.9 second and the duration of a transfer of 0.3 second; the marking machine can reach an optimal marking rate of 4000 cards per hour. The loading time for marking data into the laser means is around 50 ms and is negligible relative to the second. The unstacking or stacking time for cards performed respectively by the unstacking device (3) and the stacking device (6) on the transfer path (2) must be taken into account. Indeed, the minimum time for a transfer step carried out by the transfer path (2) includes the time of a transfer step of the transfer path and can, for example, be 300 ms and the unstacking or stacking time can be, for example, 600 ms.

Figure 2A:
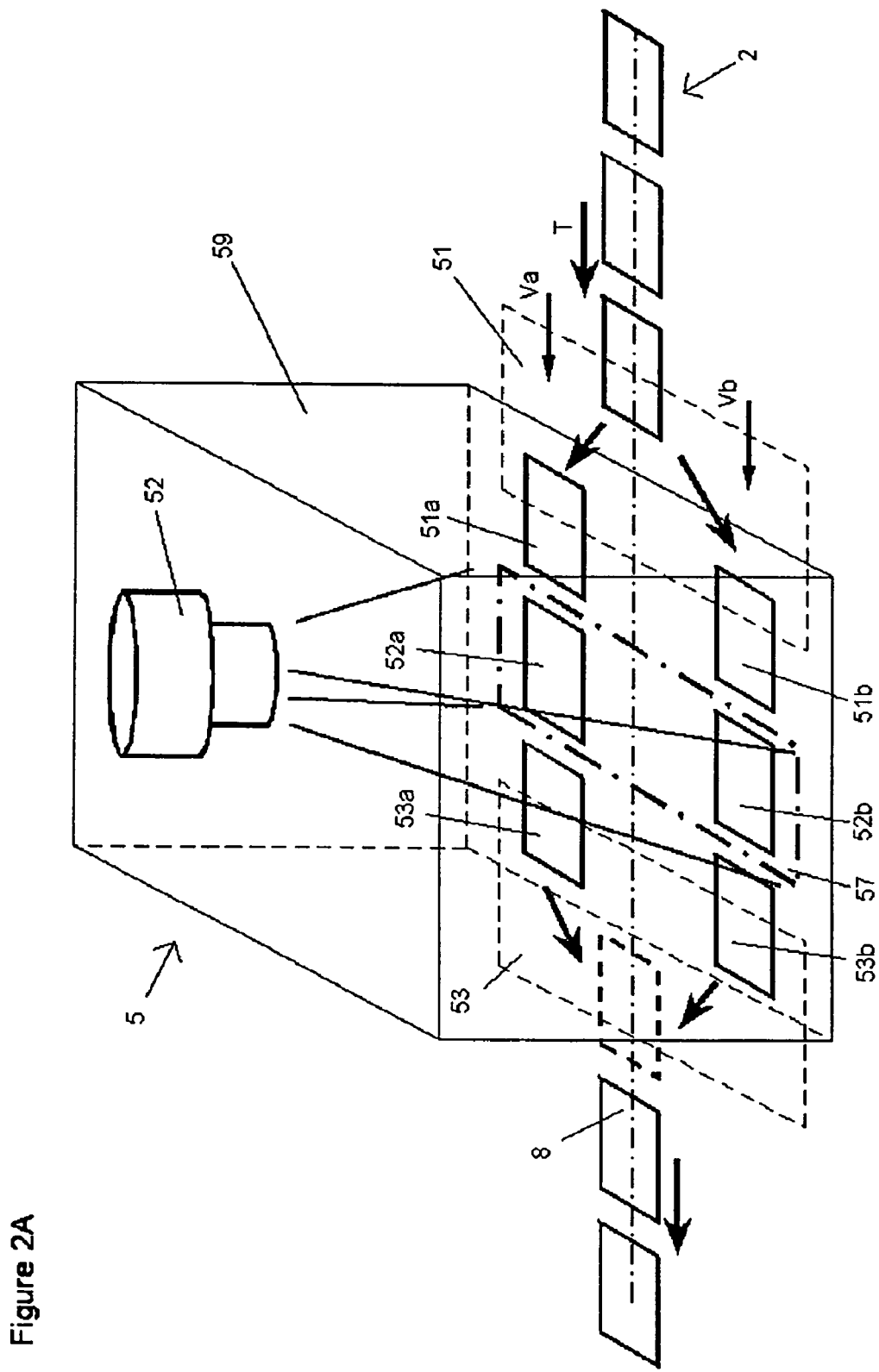
FIG. 2A is an illustrative perspective view of an embodiment of a marking machine according to the present invention.

FIG. 2A shows an embodiment of the marking machine (5) of a face of the support (81) of the smart cards (8) according to the present invention. The marking machine (5) comprises fixed laser means (52), a loading station (51), an unloading station (53) and an intra-chamber transfer path (Va, Vb). The intra-chamber transfer path (Va, Vb) of the marking machine (5) comprises at least two intra-chamber paths, a first intra-chamber path (Va) and a second intra-chamber path (Vb), arranged parallel to one another and also parallel to the transfer path (2) of the personalisation machine. In accordance with a possible embodiment, the intra-chamber transfer paths (Va, Vb) of the intra-chamber transfer path of the marking machine (5) are each formed by a continuous latched belt circulating in between two end pulleys whereof at least one is driven by a motor.

The motor of each intra-chamber path is controlled by the control system of the personalisation machine (1). The motors of the intra-chamber transfer paths (Va, Vb) of the marking machine (5) and the motor actioning the advancement of the transfer path (2) of the personalisation machine are controlled synchronously by the control system of the personalisation machine. The control of the advancement of the two intra-chamber transfer paths (Va, Vb) at each transfer step is done alternately, one intra-chamber path then the other intra-chamber path.

The transfer path (2) of the personalisation machine can, according to a first case embodiment, pass below the intra-chamber transfer paths (Va, Vb) of the marking machine (5). In accordance with a second case, the transfer path (2) of the personalisation machine can be composed of two continuous latched belts, whereof one is placed in front of the marking machine (5) and the second is placed after the marking machine (5), each latched belt circulating between two pulleys, whereof at least one of the two pulleys is controlled by the same motor.

Each intra-chamber path comprises at least three locations (51*a*, 51*b*, 52*a*, 52*b*, 53*a*, 53*b*) also known as transfer steps: an inlet location (51*a*, 51*b*) for placing the card (8) to be marked coming from the transfer path (2) of the personalisation machine (1), at least one marking location (52*a*, 52*b*) of the card (8) and one outlet location (53*a*, 53*b*) to remove the card (8) from the marking machine (5). The marking machine (5) comprises at least two distinct marking locations (52*a*, 52*b*) for cards (8), a first marking location (52*a*) situated on the first intra-chamber path (Va) and a second marking location (52*b*) situated on the second intra-chamber path (Vb). These two locations (52*a*, 52*b*) are incorporated into a chamber for protection from laser beams delimited around the scanning field (57) of the laser.

The loading device (51) comprises a divergence manipulator element passing the smart cards (8) to be marked from the single-path transfer path (2) of the personalisation machine (1) to the double-path intra-chamber transfer path (Va, Vb) of the marking machine (5). In the same way, the unloading device (53) comprises a convergence manipulator element passing the marked cards from the double-path intra-chamber transfer path (Va, Vb) of the marking machine to the single-path transfer path (2) of the marking machine (5). The laser means (52) of the marking machine (5), such as described previously, is placed below and opposite the two marking locations (52*a*, 52*b*). The laser means (52) produces a laser beam (509) whereof the axis of symmetry is projected perpendicularly relative to the smart cards housed horizontally on the two marking locations (52*a*, 52*b*), the laser beam scanning one of the two marking locations by the deflection element (201) of the laser means (52).

In reference to FIGS. 2A and 6, the operating cycle of the marking machine (5) of this first embodiment is as follows: The laser means (52) marks a first card arranged on the first marking location (52*a*) of the first intra-chamber transfer path (Va). During this time, a second card placed on the inlet location (51*b*) of the second intra-chamber transfer path (Vb) is supplied to the second marking location (52*b*), freeing up the inlet location (51*b*). After transfer of the second card, the divergence manipulator element of the loading device (51) places a fresh card to be marked on the inlet location (51*b*) of the second intra-chamber path (Vb), freeing up the transfer location situated on the transfer path (2) at the entry of the marking machine (5). On completion of marking of the first card, the laser means (52) directs its laser beam to the second location (52*b*) by means of its deflection element (501), and simultaneously the laser means (52) recovers fresh orientation data generated by the information system according to the marking data associated with the second card and then commences marking the second card.

During marking of the second card, the first card is removed to the outlet location (53*a*) by the first intra-chamber transfer path (Va) which, at the same time, supplies a fresh card to be marked on the first marking location (52*a*), freeing up the inlet location (51*a*). Then the convergence manipulator element of the unloading device (53) shifts the first card from the outlet location (53*a*) of the first intra-chamber path (Va) to a free location of the transfer path (T) of the personalisation machine (1). Concomitantly, the divergence manipulator element of the loading device (51) places a fresh card to be marked coming from the transfer path (T) of the personalisation machine (1) to the inlet location (51*a*) free of the first intra-chamber transfer path (Va) of the marking machine (5). Each time a fresh new card is added on leaving the marking machine (5) on the transfer path (2) and each time a card is removed at the inlet of the loading station (51) on the transfer path (2), the transfer path (2) advances by one step to present either a fresh card at the inlet or a free location at the outlet of the marking machine (5).

After advancement by a step of the transfer path (2), the location place facing the unstacking device (3) is free, and the location arranged facing the stacking device (6) presents a card to be stored. The storing of a card personalised and marked by the stacking device (6) and the distribution of a fresh card to be marked and personalised by the unstacking device (3) are carried out at the same time. The motors of the transfer paths (Va, Vb), the divergent manipulator element, the convergent manipulator element, and the deflection element (501) of the laser means (52) are controlled by the information system (7) of the personalisation machine and their operating tasks are synchronised.

The information system comprises means for determining the identity of the smart card and the face of the smart card to be marked, the smart card being supplied by one of the intra-chamber transfer paths (Va, Vb) on the marking location associated with the intra-chamber transfer path. The information system comprises means for determining the marking location which is to receive the card to be marked, decision means, and recovery means, as a function of these determinations, of the marking data stored in the database to transfer these marking data to the galvanometric device generating orientation data controlling the drive mechanisms of the mirrors, which will deflect the laser beam. The information system also comprises means for determining the laser marking of one of the two intra-chamber transfer paths, decision means, as a function of this determination, controlling the advancement by a step of the intra-chamber transfer path not exposed to the laser beam (509), means for determining the end of advancement of the intra-chamber transfer path and decision means controlling the action mechanisms of the convergence manipulator and the divergence manipulator.

FIG. 6 is an example of the marking cycle of the marking machine (5) according to an embodiment, indicating the different durations of the different tasks. In this example, the marking of a card lasts 0.9 second, the advancement of a card on a marking location lasts 0.3 second, the loading or unloading of a card between the marking machine and the transfer path lasts 0.5 second, the advancement of a step of the transfer path lasts 0.3 second and the unstacking or stacking of a card lasts 0.6 second. The marking time of a first card placed on a marking location (52*a*) of a first transfer path (Va) includes the withdrawal and advancement time, respectively, of a second marked card and of a third card to be marked on the second transfer path (Vb), as well as the unloading time of the second marked card and loading of a fourth card to be marked on the second transfer path (Vb). The advancement time of a step of the transfer path (2) and the unstacking or stacking time do not influence the continuous marking rate of the smart cards. In this embodiment, the marking machine (5) carries out the marking of a single face of the support of the smart cards.

Figure 2B:
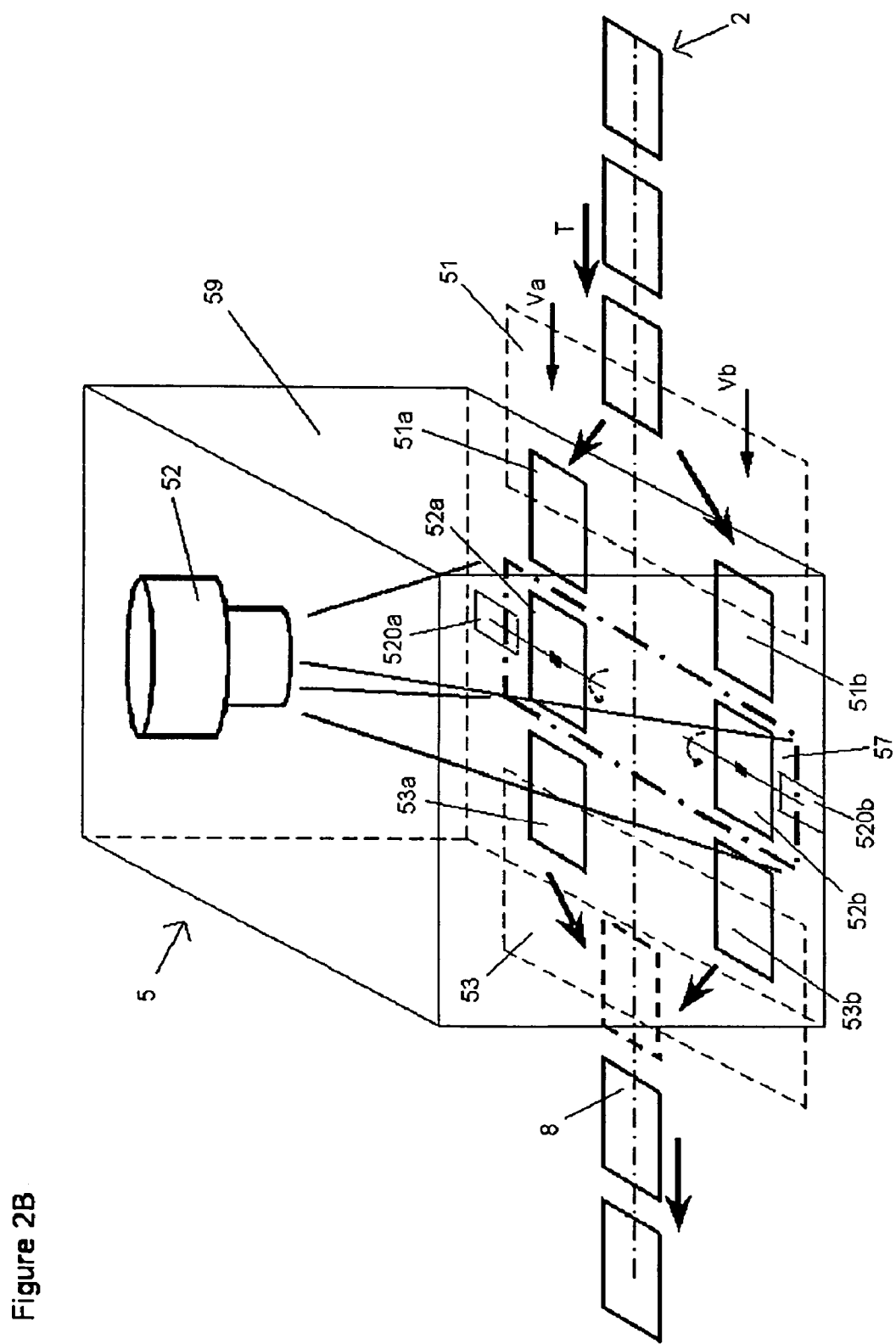
FIG. 2B is an illustrative perspective view of a marking machine for allowing cards to be marked to be returned according to an embodiment of the present invention.

In accordance with a variant embodiment of the invention, the FIG. 2B illustrates a marking station performing marking of the two faces of the support of the smart cards. The marking machine (5) is similar to the marking machine of the preceding embodiment and in addition comprises on each intra-chamber transfer path a return element (520*a*, 520*b*) for cards for performing marking of the support (81) of the smart cards on their two faces, recto and verso. Each return element (520*a*, 520*b*) is facing a marking location (52*a*, 52*b*) of each intra-chamber transfer path. Each return element (520*a*, 520*b*) can comprise a rotary clip whereof the axis of rotation can be parallel or perpendicular to the transfer path (Va, Vb). The closing and opening of the rotary clips are controlled to grip the card marked on the recto in a marking location (52*a*, 52*b*) and to then carry out rotation through 180° so as to return the card and place it on the same marking location (52*a*, 52*b*), with the non-marked face of the card exposed to the laser.

The rotation movement of the clip can be actioned by a motor controlled by the information system (7) of the personalisation machine. Each transfer path (Va, Vb) comprises at least one inlet location (51*a*, 51*b*) for placing the card (8) to be marked coming from the transfer path (T) of the personalisation machine (1), a marking location (52*a*, 52*b*) of a card (8) and an outlet location (53*a*, 53*b*) for removing the card (8) from the marking machine (5). In accordance with a variant embodiment, the marking machine (5) can comprise four marking locations, two marking locations being aligned on each transfer path of the marking machine, the return element being arranged between each marking station and returning a card from a first marking location to a second marking location of the same intra-chamber path. In these two embodiments, the operating cycle must insert a card return time after the marking of a first face of the card.

In reference to FIG. 2B, for example, the operating cycle of the marking machine (5) of this first embodiment is as follows: the laser means (52) marks a first card placed on the marking location (52*a*) of the first intra-chamber transfer path (Va). During this time a second card placed on the inlet location (51*b*) of the second intra-chamber transfer path (Vb) is supplied to the marking location (52*b*) of the second intra-chamber transfer path (Vb) freeing up the inlet location (51*b*) of the same path. The divergence manipulator element of the loading device (51) places a third card to be marked on the inlet location (51*b*) of the second intra-chamber path (Vb).

On completion of the marking of the first card, the laser means (52) directs its laser beam to the marking location (52*b*) of the second intra-chamber transfer path (Vb), at the same time, the laser means (52) recovers fresh data relative to marking of the recto face of the second card and then commences marking of the card. During marking of the second card, the return element (520*a*) of the first path grips the first card marked on its recto face, returns it and positions it, once again, on the marking location (52*a*), the verso face of the first card visible. On completion of marking of the recto face of the second card, the laser beam (52) is directed to the marking location (52*a*) of the first transfer path (Va) to mark the verso face of the first card and, at the same time, the laser means (52) recovers fresh data relative to marking of the verso face of the first card and then commences the marking of the card, according to the direction opposite the first face. During marking of the verso face of the first card, the return element (520*b*) of the second intra-chamber path (Vb) grips the second card marked on its recto face, returns it and positions it, once again, on the marking location (52*b*), the verso face of the card exposed to the laser (52). On completion of marking of the verso face of the first card, the laser (52) is directed to the marking location (52*b*) of the second intra-chamber transfer path (Vb). During marking of the verso face of the second card, the first card is evacuated to the outlet location (53*a*) of the first intra-chamber transfer path (Va) which at the same time supplies a third card to be marked, the first card then being placed on the transfer path of the personalisation machine by the convergence manipulator element and concomitantly the divergence manipulator element loads a fresh card on the inlet location of the first transfer path (Va).

The transfer path (2) and the card stacking (6) and unstacking (3) devices operate similarly to the first embodiment. The motors of the intra-chamber transfer paths (Va, Vb), the motors of the return elements (520*a*, 520*b*), the divergent manipulator element, the convergent manipulator element and the deflection element (501) of the laser means (52) are controlled by the information system of the personalisation machine and their operating tasks are synchronised. The information system comprises the same elements as the marking system presented previously in FIG. 2A, and also comprises means for determining the finish of the laser marking of a first face of a smart card, means for determining the existence of marking data intended to be engraved on the second face of the smart card and decision means, as a function of these determinations, controlling or not controlling the action mechanism of the return element associated with the marking location housing the smart card during the laser marking of another smart card housed on the second marking location.

FIG. 2C illustrates an example of another embodiment of the present invention, in which the two transfer paths (Va, Vb) are situated on the same side of the transfer path (2). This embodiment diminishes the size of the field (57) to be scanned by the laser beam (509) to cover the marking locations (52a, 52b). The laser means (52) can thus be closer to the marking locations and the precision of the laser is improved. In this embodiment, the loading (51) and unloading devices (53) could comprise divergence manipulator arms and, respectively, convergence manipulator arms (not shown) to load and, respectively, unload the cards (8). To improve the rate of the machine, two manipulator arms could be provided for each of the loading (51) and unloading devices (53). As for the preceding embodiments, in this embodiment return elements (520a, 520b) could be provided for returning the cards in the marking locations (52a, 52b). In addition, this variant embodiment is conceivable also for the other embodiment presented here. For example, in the embodiments in FIGS. 4 and 5, the transfer path (2) can be arranged to supply the cards oriented vertically (as mentioned previously) and the loading/unloading means (manipulator arms or barrels, see hereinbelow) can be situated to one side of the transfer path and adapted to place the cards to be marked on the same side of this transfer path (2).

Figure 3:
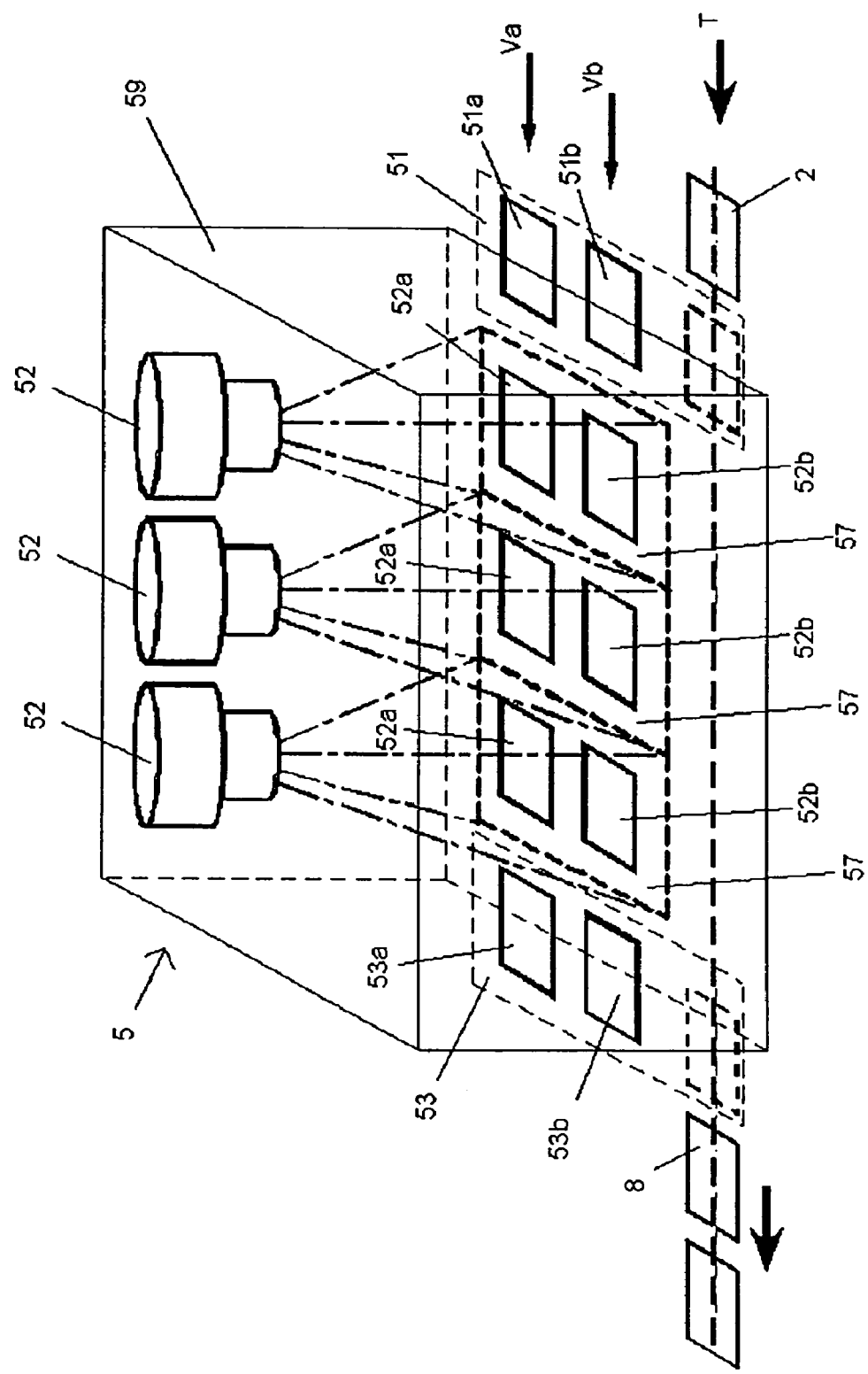
FIG. 3 is a perspective view of a marking machine according to another embodiment of the present invention comprising several lasers.

FIG. 3 represents another embodiment of a marking machine for marking supports as plastic cards, according to the present invention. This variant embodiment is particularly well adapted for marking cards whereof the marking time by the laser is long. In fact, in the case of a long marking time, for example, several seconds, it is possible to load/unload more than a single card during marking of a card by the laser. The solution proposed by this variant embodiment of the invention consists of augmenting the number of cards to be loaded at the same time on an intra-chamber transfer path (Va, Vb) and thus augment the number of lasers (52) working at the same time to mark the cards of this path (Va, Vb) during the loading/unloading of the cards of the other path (Vb, Va). In the example of FIG. 3, three lasers (52) can at the same time mark the cards loaded on three marking locations (52a, 52b) of the same intra-chamber transfer path (Va, Vb) while the unloading device (53) evacuates the three cards already marked by the three lasers of the other intra-chamber transfer path and while the loading device (51) supplies three fresh cards to be marked.

For reasons of precision of the laser due to the size of the scanning field (57) in the chamber, the example of FIG. 3 shows a variant in which the three marking locations of the same path (Va, Vb) are close to one another and are included in the same laser chamber (59), but it is evident that the invention separates the marking locations into different laser chambers (59) or at least into different laser protection chambers delimited by the scanning fields (57) of the lasers (52). It is also evident that the number of lasers (52) utilised at the same time depends on the time necessary to mark a card and thus on the time available to load a certain number of cards. The invention thus provides marking machines (5) comprising several lasers (52) though whereof only a certain number is utilised at the same time because of the marking time which does not allow loading/unloading of the cards on the locations (52a, 52b) of all the lasers (52). It is understood that this variant embodiment of the invention provides a marking machine (5) whereof the limiting laser marking time is utilised to optimise production owing to marking of several cards at the same time, as far as optionally rendering the loading/unloading time to be the limiting time. Therefore, the invention could be optimised permanently to utilise as many lasers as the other elements of the production chain would permit.

Also, FIG. 3 shows the invention with only three lasers (52) and these are arranged in series along the transfer paths (Va, Vb) of a single chamber (59), but it is evident that the invention can combine several embodiments. For example, a machine (5) comprising two laser chambers (59) each situated, for example, to one side of the transfer path (2) and each comprising 3 lasers (52), for example, arranged as in FIG. 3, at the same time marks 6 cards in a transfer path (Va, Vb) of the two chambers (59), during loading/unloading of 6 cards on the other path (Vb, Va) because of two loading devices (51) and two unloading devices (53) operating at the same time. The increase in the number of loading and unloading devices optionally allows more lasers (52) to be used at the same time and allows the marking rate to be accelerated by the machine, even for relatively short marking times. Similarly, the same laser chamber (59) comprising several lasers (52) can optionally be fed by several transfer devices (2) and several loading/unloading devices.

Figure 4:
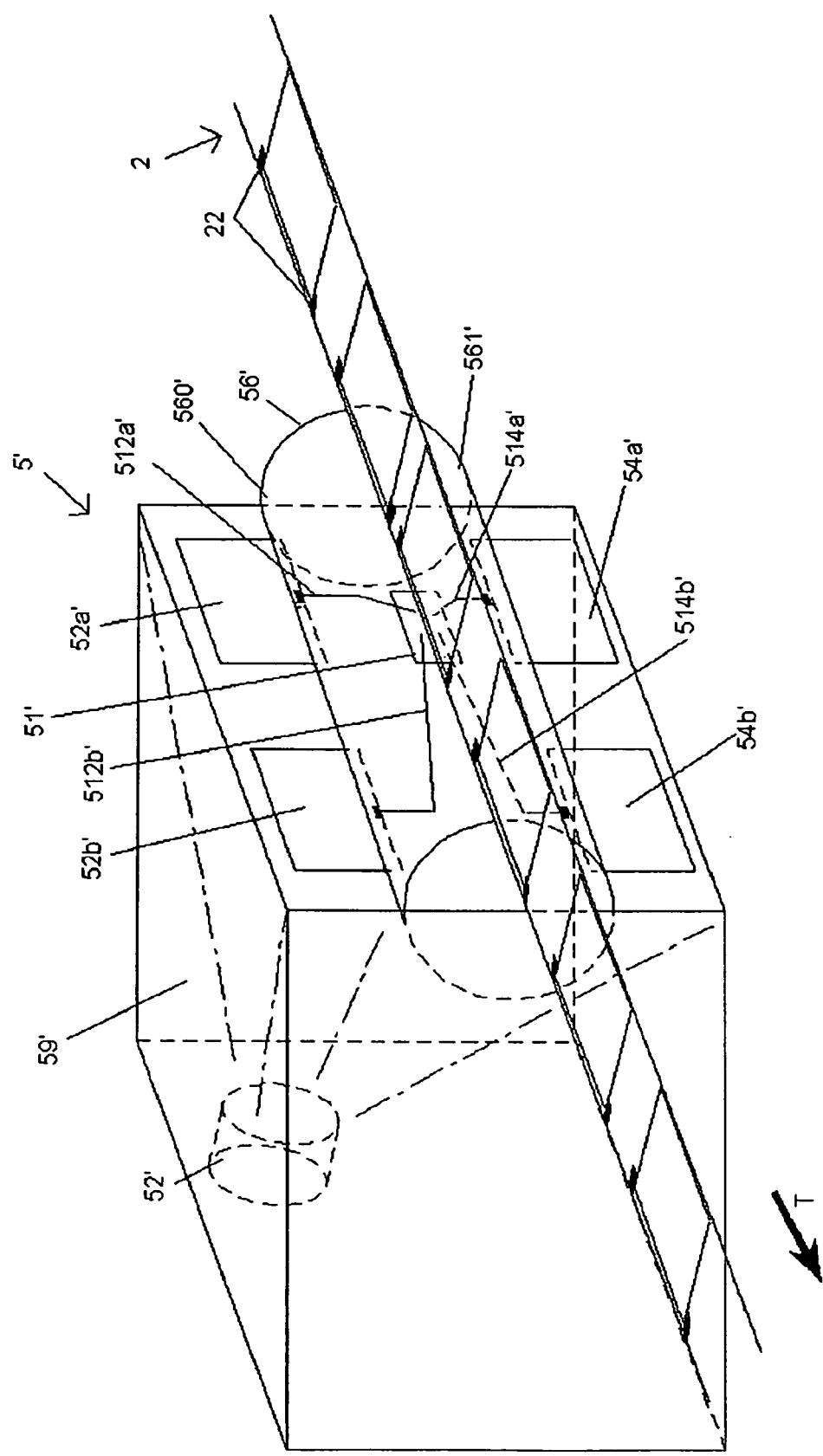
FIG. 4 is a perspective view of a marking machine according to another embodiment of the present invention.

FIG. 4 shows another embodiment of a marking machine for support as plastic cards, according to the present invention. This marking machine also comprises laser means (52') such as described previously and a transfer path (2). The transfer path (2) transports the cards in a horizontal position or according to a variant embodiment the cards are transported into a vertical position. The marking machine (5') comprises a fixed support (56'), for example, cylindrical in shape comprising an upper part (560') and a lower part (561'), the length of the support being arranged parallel to the transfer path (2) of the personalisation machine. The support (56) comprises at least four marking locations (52a', 52b', 54a', 54b') arranged in pairs, such that the cards housed in the marking locations (52a', 52b', 54a', 54b') are situated perpendicularly to the surface of the support and one of the faces of these cards is exposed to the laser beam. A pair comprises two marking locations (52a', 52b') aligned on the length of the support, each pair being arranged respectively on the upper part (560') and the lower part (561') of the support.

The marking machine (5') comprises, in addition, a single loading/unloading station (51') placed in the middle of the length of the support, facing a transfer location, in the following description referred to as a loading/unloading location, of the transfer path. This loading/unloading station (51') comprises at least two gripping means (512a', 512b', 514a', 514b'), for example, manipulator arms selectively providing in card the marking locations from a single loading/unloading location of the transfer path (2). At least one manipulator arm is fixed by one of these ends to the loading/unloading station and comprises clips (or pliers) at its other end. The manipulator arm is moved by diagonal translation between the loading/unloading location and one of the marking locations and is activated by actioning means. The clip of the manipulator arm is activated by a drive mechanism maintaining the card to be marked during laser marking of this card. The actioning means of each manipulator arm and the drive mechanism of each clip of a manipulator arm are controlled by the information system (7) of the personalisation machine. The laser marking means produces a laser beam whereof the axis of symmetry is projected perpendicularly relative to the smart cards housed in the marking locations. In an embodiment of the invention, the loading station (51') comprises four manipulator arms (512a', 512b', 514a', 514b') each allocated to a marking location (52a, 52b, 54a, 54b), thus allowing a gain in time and facility for managing the different actioning means of the manipulator arms.

The transfer path (2) comprises a guide rail for the arrival of the cards and a guide rail at the outlet of the marking machine, a clip, disposed in between the two guide rails, allowing gripping a card to be marked placed on the loading/unloading location or supplying a card marked on this same loading/unloading location. This embodiment allows only a single face of the cards to be marked at fast rate. In reference to FIG. 4, the cards housed in the marking locations on the upper part of the support are marked on the recto face and the cards housed on the lower part of the support are marked on the verso face. The laser means is directed alternatively to the marking locations where a card ready to be marked is present.

The operating cycle of this system is described hereinafter. A card is supplied by the transfer path (2) on the loading/unloading location, a manipulator arm (512a') grips the card by closing its clip and places it on the marking location (52a') free of the marking support (56) associated with the manipulator arm (512a'), then the laser beam marks the exposed face of the card. During the marking of the card, a second manipulator arm (512b') holding a previously marked card, relocates the card from the marking location (52b') associated with the manipulator arm (512b') to position it on the loading/unloading location and the opening of the clip of the arm is controlled. The transfer path (2) extracts the marked card from the loading/unloading station and at the same time supplies a fresh card on the loading/unloading location, then the clip of the arm (512b') recloses and replaces a fresh card ready to be marked in the marking location (52b'). On completion of marking of the first card, the laser is directed to another card to be marked placed on one of the other marking locations (52b', 54a', 54b'), where a face of a card ready to be marked is exposed to the laser. The manipulator arm (512a') associated with the marking location (52a') which has just been exposed to the laser moves the card to position it on the loading/unloading location, and the clip of the arm is then controlled on opening. After shifting one step of the transfer path (2), the card unstacking device (3) distributes a fresh card on the transfer path (2) and simultaneously the card device stacker (6) stores a personalised and marked card in its magazine.

The information system (7) linked to the marking machine (5) will control the shifting of the manipulator arms (5', 512b', 514a', 514b'), the opening and closing of the clips of the manipulator arms and the shifting of the deflection element (501) of the laser so as to mark on a card the information corresponding to it. The information system comprises means for determining the identity of the smart card and its face to be marked supplied by the transfer path in the vicinity of the loading/unloading device, means for determining the marking location which is to receive the card to be marked, decision and recovery means, as a function of these determinations, of the marking data stored in the database to transfer them to means for generating the orientation data controlling the drive mechanisms of the mirrors deflecting the laser beam either during marking of the face of a smart card or during shifting of the laser beam from one marking location to another marking location. The information system also comprises means for determining the laser marking on one of the marking locations, decision means, as a function of this determination, controlling the actioning means of the manipulator arms and the drive mechanism of the clip of the same manipulator arm for unloading the smart card previously marked on the transfer path, means for determining the unloading of the smart card, decision means, as a function of this determination, for controlling the advancement of the transfer path by one step and decision means for activating the actioning means of the manipulator arm and the drive mechanism of the clip for loading a fresh smart card to be marked on the marking support.

The marking device (5) carries out, either marking the recto of the cards housed on the upper marking locations (560') once only, or once only the marking verso of the cards housed on the lower marking locations (561'), or the marking recto of cards and the marking verso of other cards. This embodiment does not allow the cards to be marked on their two faces. However, for cards which need marking once only on a single face the control of this marking machine (5') is simple: It only requires a single loading/unloading station (51') and the laser means (52') to be controlled. The laser field of the laser means covers a focus surface comprising four cards to be marked alternately. The four marking locations (52a', 52b', 54a', 54b') are incorporated into a laser protection chamber (59').

Figure 7A:
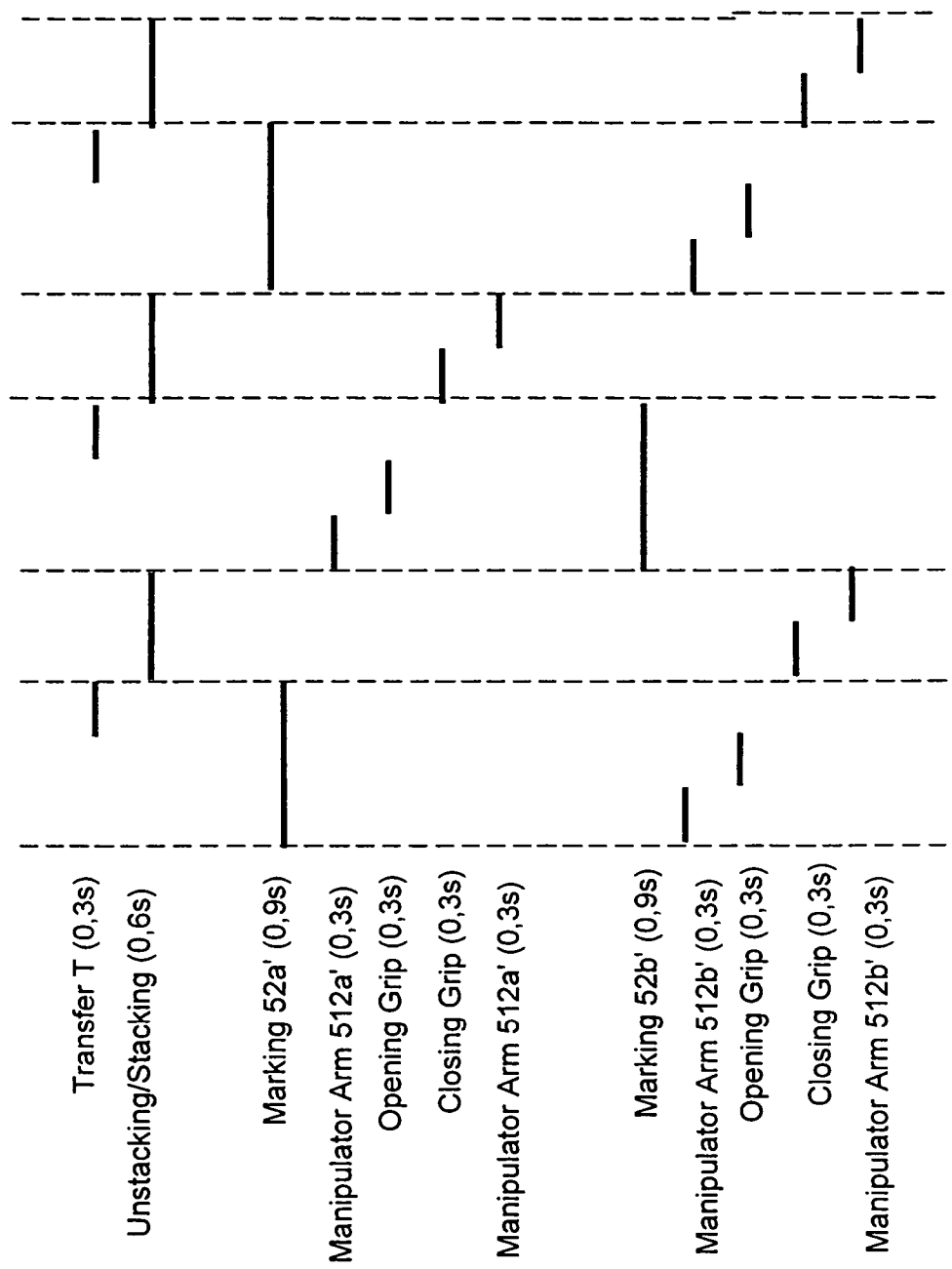
FIGS. 7A and 7B are time flow diagrams of the operation of a marking machine according to an embodiment of the present invention, such as that of FIG. 4.

FIG. 7A illustrates an operating example of the marking machine (5') in accordance with an embodiment of the present invention which proposes one-off recto marking of the cards. In this example, the marking time is 0.9 second, the shift time of the manipulator arms is 0.3 second, the opening or closing time of the clips of the manipulator arms is 0.3 second, the time of a transfer step of the transfer path (2) is 0.3 second and the time of unstacking and stacking the cards on the transfer path is 0.6 second. It is noticed that the laser cannot carry out marking on the second marking location while the manipulator arms of the latter have yet to complete loading a card, or during a period of 0.6 second. The complete marking of a card is thus done in 1.5 second (0.9+0.6) and the marking rate of the cards is 2400 cards per hour.

Figure 7B:
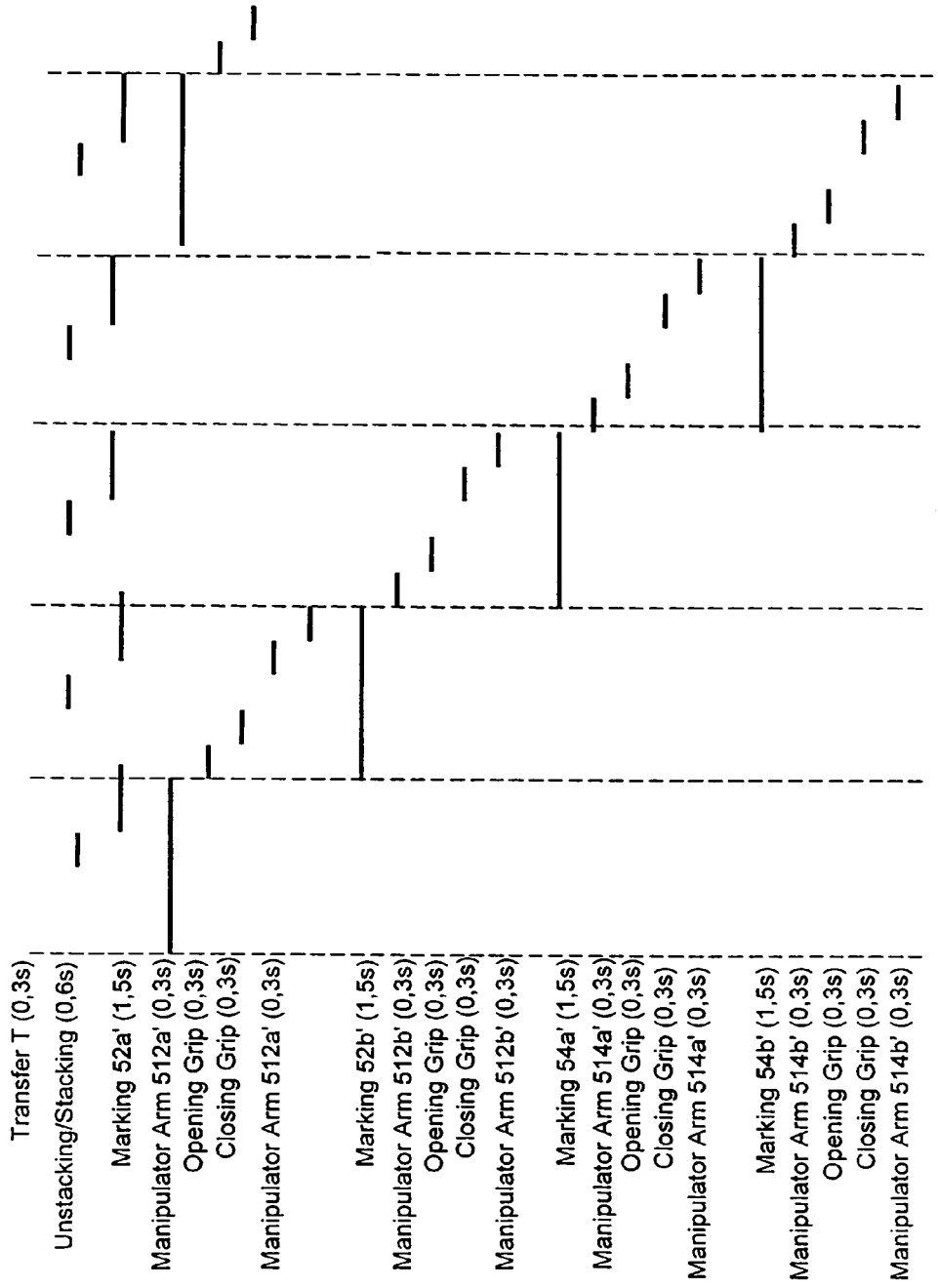

FIG. 7B illustrates an example of the functioning of the marking machine (5') in accordance with an embodiment of the present invention, proposing recto marking of two first cards and verso marking of two others cards. In this example, the laser is directed to all the marking locations with a marking time of 1.5 second per face. The marking of a card is completed in 1.5 second and the marking rate of the cards is 2400 cards per hour.

Figure 5:
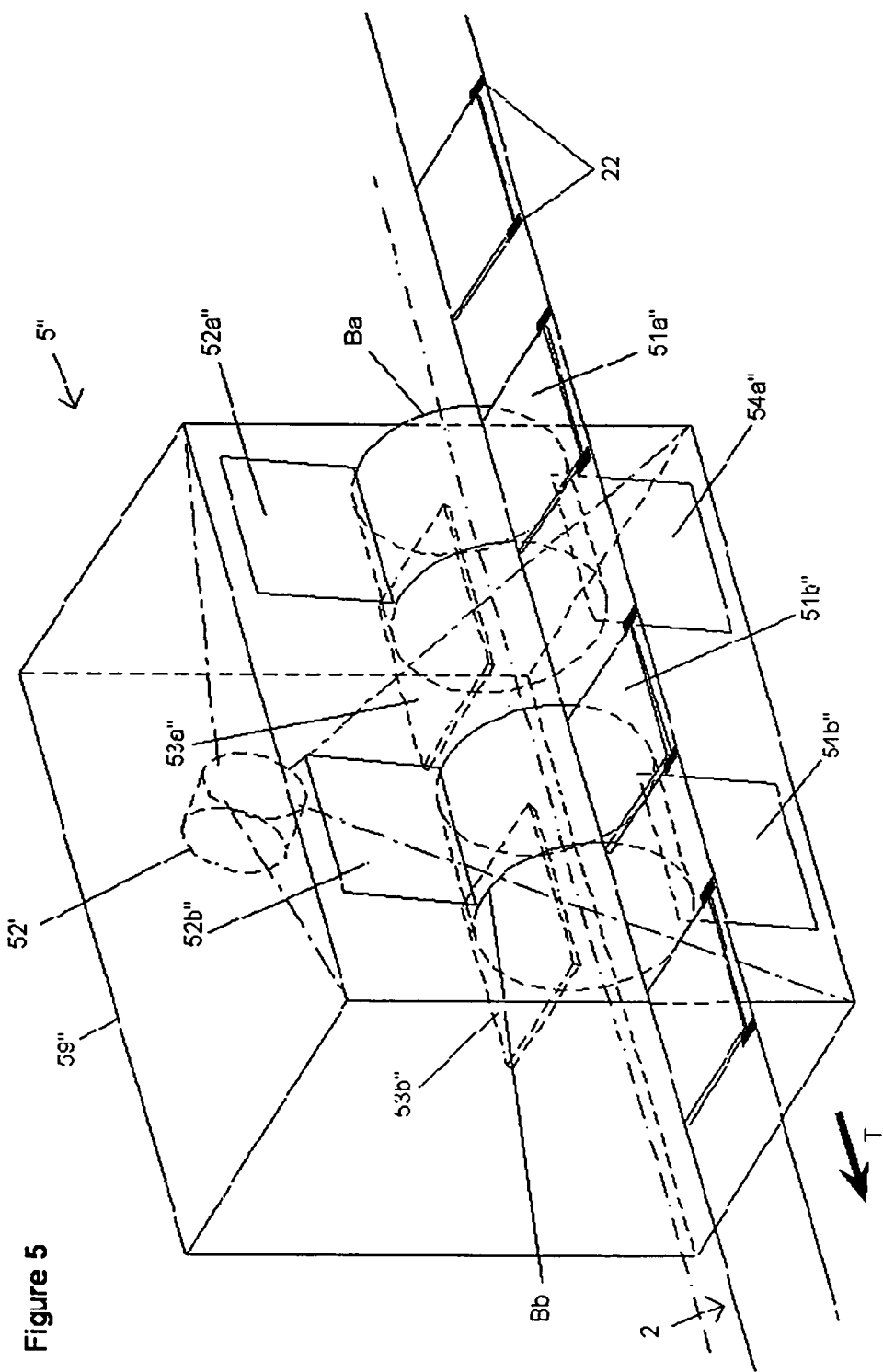
FIG. 5 is a perspective view of a marking machine according to another embodiment of the present invention allowing marking of two faces of a support.

FIG. 5 shows another embodiment of the marking machine of the present invention, enabling marking of the supports of the smart cards on the recto and/or the verso. This marking machine (5") comprises a marking chamber (59") comprising laser means (52") such as described previously, and at least two cylindrical barrels (Ba, Bb) aligned on their axis and turning according to their longitudinal axis of rotation arranged horizontally and parallel to the transfer path (2). A drive mechanism, such as a motor, is attached to each axis of rotation of the barrels and activates the rotation of the barrels in a single direction, the two barrels turning in the same direction. Each barrel (Ba, Bb) supports on its periphery at least 4 gripping positions, known hereinafter in the description as marking locations (51a", 52a", 53a", 54a", 51b", 52b", 53b", 54b"). These marking locations are oriented perpendicularly to the axis of rotation of the barrel.

Each marking location of a barrel is distant by an angle of 90° from the marking following location and the preceding marking location. The cards housed in these marking locations are arranged perpendicularly to the surface of the barrel. Each marking location (51*a*", 52*a*", 53*a*", 54*a*", 51*b*", 52*b*", 53*b*", 54*b*") comprises gripping means of a card mounted in pairs, such as clips controlled for their opening and their closing, whereof the distance between two of the gripping means holds a card vertically without impairing marking.

The transfer path (2) comprises a guide rail for the arrival of the cards and a guide rail at the outlet of the marking machine enabling a pair of gripping means to be connected in between the two guide rails to grip a card to be marked placed on the loading/unloading location or for supplying a card marked on this same loading/unloading location. Thus, a marking location of the barrel is placed parallel to the transfer path, and the gripping means of the marking location are placed in the orientation of the cards between the guide rail for the arrival of cards and the guide rail at the outlet of the marking machine formed by the turning barrel. The gripping clips of the cards are placed between a pair of clips of the transfer path and do not impair the advancement of the cards on the transfer path. For example, the gripping clips are open when the transfer path advances and close on a card to be marked before the barrel describes a rotation. The marking locations are supplied successively in the two recto and verso marking positions arranged in a vertical plane. The laser means produces a laser beam whereof the axis of symmetry is projected perpendicularly to the marking plane of the marking positions.

In reference to FIG. 5, each barrel turns by a value of a quarter turn of the barrel, at each operating cycle. This rotation by step of a quarter turn allows each marking location of the barrel to move from a loading/unloading position situated horizontally on the transfer path, to a marking position of the recto of the support of a card arranged vertically, for example, on the upper part of the barrel, then to a rest position diametrically opposed to the loading/unloading position and to a marking position of the verso of the support of the card, diametrically opposed to the marking position of the recto.

The information system (7) controls the motors of the barrels (Ba, Bb), the advancement of the transfer path (2) and the devices for unstacking (3) and stacking (6) the cards. The operating cycle of a barrel is controlled by means for managing the information system (7) and is as follows. After marking of the recto of a card, the barrel turns by a quarter turn placing the card previously marked in a wait position and offering a fresh card to be marked in a marking position of the recto face, a fresh card to be marked in a marking position of the verso face and a card marked on these two faces in a loading/unloading position. After rotation of the barrel, the gripping clips of the marking location situated in a loading/unloading position open and the transfer path advances to eject the card marked on its two faces and present a fresh card to be marked. The gripping clips of the loading/unloading location then close. The second barrel repeats the same operating cycle as the first barrel. The rotation motors of the two barrels, the opening and closing of the gripping clips of the marking locations in the loading/unloading position, the advancement of the transfer path and the unstacking or stacking of cards are controlled by the information system of the personalisation machine.

These various elements are controlled such that the transfer path takes two steps of advancement to load and unload the two barrels at each advance of the transfer path (2) and such that the laser means (52") continuously mark the cards by the laser means (52"). Accordingly, rotation of the barrels does not take place when the transfer path advances and before the advancement of the transfer path, the two marking locations in the loading/unloading position must present a card to be removed and must have their gripping clips opened. The information system comprises means for determining the identity of the smart card and its face to be marked supplied by the transfer path in the vicinity of the barrel, means for determining and detecting of the marking location which is to receive the card to be marked, decision and recovery means, as a function of these determinations, of the marking data stored in the database to transfer them to means for generating orientation data controlling the drive mechanisms of the mirrors deflecting the laser beam either during marking of the face of a card or during shifting the laser beam from one marking location to another marking location. The information system also comprises means for determining the laser marking directed to one of the marking locations of a first barrel, decision means, as a function of this determination, controlling the drive mechanism of the second barrel not exposed to the laser beam to supply a gripping position in the vicinity of the transfer path, means for detecting stopping of rotation of the second barrel, decision means controlling the gripping means of the gripping positions, two barrels, arranged in the vicinity of the transfer path for unloading a previously marked card, detection means and means for determining the unloading of cards, decision means as a function of this determination for controlling the advancement of the transfer path by two steps and decision means for activating the gripping means of the gripping positions arranged in the vicinity of the transfer path for loading fresh cards to be marked on the barrels.

Figure 8:
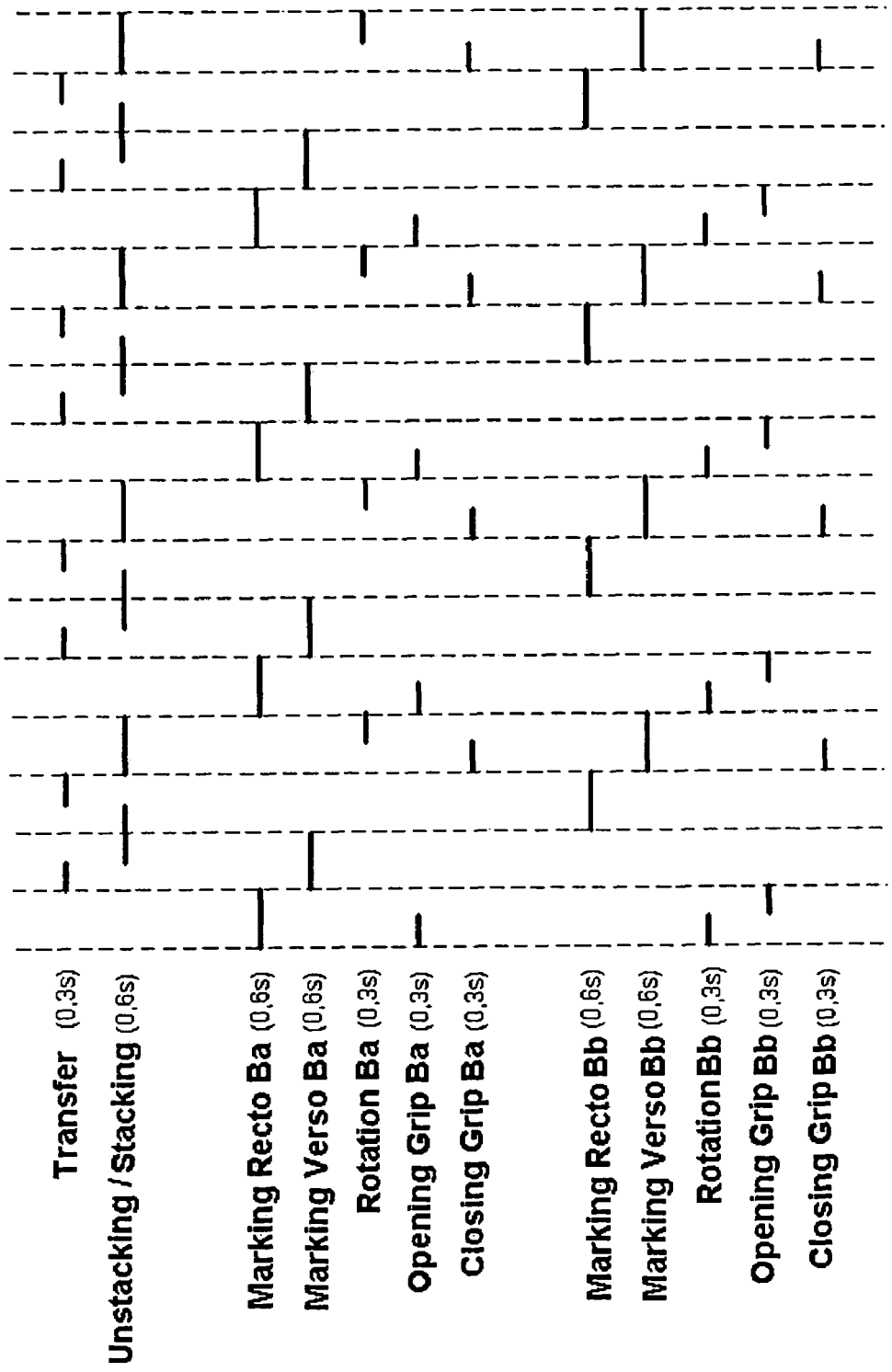
FIG. 8 is a time flow diagram of operation during marking of two faces of a support with a marking machine in accordance with an embodiment of the present invention, such as that of FIG. 5.

FIG. 8 is an example of the operating of the two barrels during marking of the recto and verso of a card. In this example the marking time of a card is 0.6 second per face, the opening and closing time of the gripping means of the marking locations are 0.3 second, the transfer time of two steps of the transfer path is 0.6 second (or 0.3 second per step) and the time for unstacking and stacking is 0.6 second. The marking machine can thus complete marking 6000 smart cards faces per hour.

It must be evident for these skilled in the art that the present invention enables embodiments in numerous other specific forms without departing from the scope and the field of application of the invention as claimed. Consequently, the present embodiments must be considered by way of illustration, but can be modified in the domain defined by the range of the attached claims, and the invention must not be limited to the details given hereinabove.

The invention claimed is:

1. A laser marking machine for objects, namely supports or cards carrying integrated circuits, the laser marking machine comprising:
   at least one laser chamber comprising at least two marking locations for receiving the objects to be marked on at lease one face by at least one laser marker for producing a laser beam and comprising optics for alternately deflecting the laser beam onto one of the marking locations, the laser beam and the optics being arranged for marking an object at a marking location while another object already marked at another of the marking locations is replaced by a new object to be marked, at least one transfer device having a transfer path for transporting the objects to be marked or already marked, respectively to or out of the laser chamber; and at least one loading and unloading device for loading an object to be marked from the transfer path onto a marking location and for unloading an object already marked from a marking location onto the transfer path, while an object is being marked at another marking location.

2. The laser marking machine as claimed in claim 1, wherein the laser marking machine is linked to an information system comprising a database for (a) storing marking data to be transferred to the laser marking machine and (b) for generating orientation data for orienting the optics for directing the laser beam to be deflected to the one of the locations.

3. The laser marking machine according to claim 2, wherein the laser marker is fixed, the optics of the fixed laser marker comprising a production element of a laser beam arranged to be responsive to a function of the marking data stored in the database of an information system, a deflector element of the laser beam receiving the produced laser beam for directing the laser beam to one of the marking locations and for directing the laser beam to the objects during laser marking as a function of the orientation data received about the objects and a refining element of the laser beam.

4. The laser marking machine according to claim 3, wherein the deflector element of the laser beam comprises an inlet opening, an outlet opening and first and second mirrors, a galvanometric device for controlling the inclination of each mirror, the mirrors being arranged opposite one another, such that the laser beam, produced by the production element of the laser beam as a function of the marking data and passing through the inlet opening of the deflection element, is caused to be projected onto the first mirror for reflecting the laser beam and projecting it onto the second mirror for also reflecting the laser beam directing it to the outlet opening of the deflection element and orienting it to a marking location, a drive mechanism arranged to be controlled by orientation data of an information system for controlling the inclination of each of the two mirrors, one of the two mirrors being inclined according to a vertical axis of rotation for deflecting the laser beam horizontally, and the other mirror being inclined according to its horizontal axis of rotation for deflecting the laser beam vertically.

5. The laser marking machine according to claim 3, wherein the laser marker comprises a refining element for the laser beam located between the deflection element of the laser beam and the marking locations.

6. The laser marking machine according to claim 1, wherein both of the marking locations are situated on the same side of the transfer device at locations for reducing the size of a field to be scanned by the laser beam to cover both of the marking locations and improve the precision of the laser beam.

7. The laser marking machine according to claim 1, wherein the loading/unloading device comprises:

at least one loading device located in the vicinity of the transfer device and the laser chamber for loading the objects to be marked from the transfer device to one of the two marking locations;

at least one unloading device located in the vicinity of the transfer device and the laser chamber to unload the previously marked objects from one of the marking locations to the transfer device.

8. The laser marking machine as claimed in claim 1, further comprising an unstacking device for objects to be distributed along the transfer path, and a stacking device for objects to be removed from the transfer path to be stored in a magazine.

9. The laser marking machine as claimed in claim 1, wherein the object includes an integrated circuit of a smart card coupled to an information system further comprising a personalizing device for personalizing data in a database capable of corresponding with marking data for the smart card, the information system being arranged for following up the personalization and the marking of the smart cards.

10. The machine of claim 5 wherein the refining element includes a lens for conveying the laser.

11. A laser marking machine for objects in the form of supports or cards carrying integrated circuits, the laser marking machine comprising:

at least one laser chamber comprising at least two marking locations for receiving the objects to be marked on at least one face by at least one laser marker for producing a laser beam and comprising optics for alternately deflecting the laser beam onto one of the marking locations, the laser beam and the optics being arranged for marking an object at a marking location while another object already marked at another of the marking locations is replaced by a new object to be marked, at least one transfer device having a transfer path for transporting the supports to be marked or already marked, respectively to and/or out of the laser chamber; and two cylindrical barrels, each having four gripping positions for placing the objects to be marked in planes passing through an axis of rotation of the barrels and oriented perpendicularly to one another, the barrels comprising grips for the objects to be marked, each of the grips having gripping positions arranged to be reached successively in two recto and verso marking positions arranged in a vertical marking plane, the marker having an axis of symmetry perpendicular to the marking plane, the transfer path parallel to the axis of rotation of the barrels being arranged for ensuring the insertion and removal of each of the gripping positions, the barrels being each connected to a drive mechanism controlled by the information system.

12. The laser marking machine as claimed in claim 11, wherein the information system is arranged for (a) determining the identity and the face to be marked of the object supplied by the transfer path in the vicinity of the barrel, (b) determining and detecting the gripping position which is to receive the object to be marked, (c) marking, as a function of these determinations, data stored in the database and for transferring the data to a generator for generating orientation data for controlling the drive mechanisms of the mirrors arranged for deflecting the laser beam during the marking of one face of an object or during shifting of the laser beam from one marking location to another marking location.

13. The laser marking machine as claimed in claim 11, wherein the information system is arranged for (a) determining the laser marking directed in one of the marking locations of a first barrel, (b) controlling, as a function of this determination, the drive mechanism of the second barrel not exposed to the laser beam for deriving an indication of desired gripping position in the vicinity of the transfer path, (c) detecting the stopping of rotation of the second barrel, (d) controlling the gripping positions of the two barrels, (e) unloading a previously marked object in the vicinity of the transfer path, (f) determining unloading of the objection, (g) controlling the advancement of the transfer path by two steps, as a function of determination, and (h) activating a gripper of the gripping positions in the vicinity of the transfer path for enabling fresh objects to be marked to be loaded on the barrels.

14. A laser marking machine for objects in the form of supports or cards carrying integrated circuits, the laser marking machine comprising:
   at least one laser chamber comprising at least two marking locations for receiving the objects to be marked on at least one face by at least one laser marker for producing a laser beam and comprising optics for alternately deflecting the laser beam onto one of the marking locations, the laser beam and the optics being arranged for marking an object at a marking location while another object already marked at another of the marking locations is replaced by a new object to be marked,
   at least one transfer device having a transfer path for transporting the objects to be marked or already marked, respectively to and/or out of the laser chamber; and
   a marking support arranged in a vertical plane and comprising an upper part and a lower part, each part comprising a marking location for enabling a vertically disposed housing of the objects to be marked, each marking location being arranged to be selectively reached by at least one manipulator arm included in a loading/unloading device, from a transfer path passing via a plane perpendicular to the marking support, the laser marker having an axis of symmetry projected perpendicularly relative to the objects to be marked housed in the marking locations, the laser beam being capable of scanning one of each of the marking locations at the same time.

15. The laser marking machine as claimed in claim 14, wherein each manipulator arm is included in the loading/unloading device in the vicinity of the marking support and the transfer path, each manipulator arm comprising a drive for directing the arm to one of the marking locations or to the transfer path, a gripping clip at the end of the manipulator arm comprising a drive mechanism for enabling an object in the transfer path to be gripped and the object to be held during the laser marking one of its faces, the drive mechanism of the clip and the drive of each manipulator arm being arranged to be controlled by the information system alternately.

16. The laser marking machine as claimed in claim 14, wherein each marking location on the upper part of the marking support marking of one face of an object, and each marking location on the lower part of the marking support arranged to cause marking of another face of the object.

17. The laser marking machine as claimed in claim 14, wherein the information system is arranged for (a) determining the identity and the face to be marked of the object supplied by the transfer path in the vicinity of the loading/unloading device, (b) determining the marking location which is to receive the object to be marked, decision and recovery means, (c) marking data stored in a database, as a function of these determinations, to transfer the data to a generator of orientation data for controlling the drive mechanisms of the mirrors for deflecting the laser beam either during marking of one face of an object, or during the shifting of the laser beam from one marking location to another marking location.

18. The laser marking machine as claimed in claim 14, wherein the information system is arranged for (a) determining the laser marking on one of the marking locations, (b) controlling, as a function of this determination, the drive of the manipulator arm and the drive mechanism of the clip of the same manipulator arm for loading the object previously marked on the transfer path, (c) determining the unloading of the object, (d) controlling, as a function of determination (c), the advancement of the transfer path by a step, and (e) activating the drive of the manipulator arm and the drive mechanism of the clip for loading a another object to be marked on the marking support.

19. A laser marking machine for objects in the form of supports or cards carrying integrated circuits, the laser marking machine comprising:
   at lease one laser chamber comprising at least two marking locations for receiving the objects to be marked on at least one face by at least one laser marker for producing a laser beam and comprising optics for alternately deflecting the laser beam onto one of the marking locations, the laser beam and the optics being arranged for marking an object at a marking location while another object already marked at another of the marking locations is replaced by a new object to be marked,
   at least one transfer device having a transfer path for transporting the supports to be marked or already marked, respectively to and/or out of the laser chamber; and
   wherein the at least one laser has a single laser chamber comprising a plurality of laser markers directed to a plurality of pairs of marking locations for marking objects on at least one face of the objects, the optics of each of the laser markers being arranged for deflecting its associated laser beam alternately onto one of the two marking locations of each of the pairs of marking locations.

20. A laser marking machine for objects, namely supports or cards for integrated circuits, the laser marking machine comprising:
   at least one laser chamber comprising at least two marking locations for receiving the objects to be marked on at least one face by at least one laser marker for producing a laser beam and comprising optics for selectively deflecting the laser beam onto one of the marking locations, and
   at least one transfer device having a transfer path for transporting the objects to be marked or already marked, respectively to and/or out of the laser chamber, the laser chamber comprising two distinct intra-chamber transfer paths, each arranged to be driven by a respective drive mechanism and arranged parallel relative to one another, each intra-chamber transfer path comprising an inlet location, a marking location and an outlet location, the objects to be marked being housed horizontally in the locations, the two inlet locations being in the vicinity of the loading device and comprising at least a divergence manipulator for loading the objects to be marked coming from a single-path transfer device on one of the two inlet locations of the intra-chamber paths, the two outlet locations being in the vicinity of the unloading device and comprising at least one convergence manipulator for enabling the marked objects to be unloaded from one of the two outlet locations on the transfer device having one transfer path, the laser marker facing the two marking locations and an axis of the laser beam produced by the laser marker, the beam axis being in a plane perpendicular to the marking locations, the laser beam being capable of scanning the marking locations and scanning a marking location of one transfer path at the same time; the drive mechanisms of the two intra-chamber transfer paths, the convergence and divergence manipulators of the loading devices and, respectively, unloading devices and the mirrors of the deflection element being arranged to be alternately controlled by the Information system for enabling an object housed at the marking location of a first intra-chamber transfer path to be marked, while the other intra-chamber transfer path supplies another object to be marked on its marking location.

21. The laser marking machine as claimed in claim 20, wherein the information system is arranged for (a) determining the identity and the face to be marked of the object supplied by one of the intra-chamber transfer paths on the marking location associated with the intra-chamber path, (b) determining the marking location which is to receive the object to be marked, (c) marking data stored in the database, as a function of these determinations, for transferring the marked data to a generator of orientation data for controlling the drive mechanisms of the mirrors for deflecting the laser beam either during marking of the face of an object or during the shifting of the laser beam from one marking location to another marking location.

22. The laser marking machine as claimed in claim 20, wherein the information system is arranged for (a) determining the laser marking on one of the two intra-chamber transfer paths, (b) controlling, as a function of this determination, the advancement by one step of the intra-chamber transfer path not exposed to the laser beam, (c) determining the completion of advancement of the intra-chamber transfer path and (d) controlling the drive mechanisms of the convergence manipulator and the divergence manipulator.

23. The laser marking machine as claimed in claim 20, wherein each transfer path of the laser chamber comprises a return element facing the marking location and comprising a rotary clip for enabling, because of an axis of rotation aligned in the plane of the transfer paths, a marked object on one of these faces to be returned and to be repositioned at the same marking location, so as to mark the other face by the marker according to the direction opposite the first face, the rotation of the clip of a turning element being arranged to be activated by a drive mechanism; the drive mechanism of the two transfer paths of the laser chamber, the mirrors of the deflection element and these return elements being arranged to be controlled alternately by the information system.

24. The laser marking machine as claimed in claim 20, wherein the information system is arranged for (a) determining the completion of the laser marking of a first face of an object, (b) determining the existence in a database of marking data intended to be engraved on a second face of the object, and (c) deciding, as a function of these determinations, whether to control or not control the drive mechanism of the return element associated with the marking location housing the object during the laser marking of another object housed at the second marking location.

* * * * *